(12) United States Patent
Kubo et al.

(10) Patent No.: US 12,737,036 B2
(45) Date of Patent: Sep. 15, 2026

(54) INFORMATION PROCESSING DEVICE, MANIPULATION SYSTEM, INFORMATION PROCESSING METHOD, AND STORAGE MEDIUM

(71) Applicant: Mitsubishi Electric Corporation, Tokyo (JP)

(72) Inventors: Toshiaki Kubo, Tokyo (JP); Akinori Taira, Tokyo (JP); Seiji Kozaki, Tokyo (JP); Fumiki Hasegawa, Tokyo (JP); Kotaro Asai, Tokyo (JP); Takeshi Imai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 12 days.

(21) Appl. No.: 18/848,921

(22) PCT Filed: Mar. 28, 2022

(86) PCT No.: PCT/JP2022/015047
§ 371 (c)(1),
(2) Date: Sep. 20, 2024

(87) PCT Pub. No.: WO2023/187912
PCT Pub. Date: Oct. 5, 2023

(65) Prior Publication Data
US 2025/0231611 A1 Jul. 17, 2025

(51) Int. Cl.
*G06F 3/01* (2006.01)

(52) U.S. Cl.
CPC .................................... *G06F 3/011* (2013.01)

(58) Field of Classification Search
CPC .. G06F 3/011; G06F 3/01; B25J 13/08; G05B 23/02; G05D 1/00
See application file for complete search history.

(56) References Cited

U.S. PATENT DOCUMENTS 5,855,553 A 1/1999 Tajima et al.
2012/0277901 A1 11/2012 Jacobsen et al.
(Continued)

FOREIGN PATENT DOCUMENTS

EP 3141329 A1 * 3/2017 ................ F16P 1/06
JP H08-215211 A 8/1996
(Continued)

OTHER PUBLICATIONS

International Search Report and Written Opinion mailed on May 31, 2022, received for International Application No. PCT/JP2022/015047, filed on Mar. 28, 2022, 9 pages including English Translation.

*Primary Examiner* — Nhi Q Bui
(74) *Attorney, Agent, or Firm* — XSENSUS LLP

(57) ABSTRACT

An information processing device according to the present disclosure includes a detection information reception unit that receives five-sense information, which is perceivable by at least one of five senses of human, and extended five-sense information, which is information difficult to be perceived by the five senses of human; a visual data conversion unit that converts the extended five-sense information into converted five-sense data, which represents information perceivable by at least one of the five senses of human; a visual data combining unit that combines a piece of the converted five-sense data with a piece of the five-sense information; and a representation information transmission unit that transmits combined data, which is a result of combining, to a representation device that transfers the combined data to the user to enable the user to perceive the combined data.

16 Claims, 8 Drawing Sheets

(56) References Cited

U.S. PATENT DOCUMENTS

| | | | | |
|---|---|---|---|---|
| 2012/0277911 | A1 | 11/2012 | Jacobsen et al. | |
| 2012/0277915 | A1 | 11/2012 | Jacobsen et al. | |
| 2012/0328395 | A1 | 12/2012 | Jacobsen et al. | |
| 2013/0011220 | A1 | 1/2013 | Jacobsen et al. | |
| 2013/0013108 | A1 | 1/2013 | Jacobsen et al. | |
| 2015/0142172 | A1 | 5/2015 | Jacobsen et al. | |
| 2015/0203340 | A1 | 7/2015 | Jacobsen et al. | |
| 2016/0015470 | A1* | 1/2016 | Border | A61B 90/50 600/117 |
| 2017/0087363 | A1* | 3/2017 | Costanzo | A61N 1/0548 |
| 2018/0193999 | A1 | 7/2018 | Jacobsen et al. | |
| 2020/0314333 | A1* | 10/2020 | Liang | H04N 7/181 |
| 2020/0341540 | A1* | 10/2020 | Jin | G06F 3/016 |
| 2021/0069889 | A1 | 3/2021 | Jacobsen et al. | |
| 2021/0162603 | A1* | 6/2021 | Shimomura | B25J 13/025 |
| 2022/0410366 | A1 | 12/2022 | Smith et al. | |
| 2022/0410367 | A1 | 12/2022 | Smith et al. | |
| 2024/0149458 | A1* | 5/2024 | Watabe | B25J 9/1689 |

FOREIGN PATENT DOCUMENTS

| | | | |
|---|---|---|---|
| JP | H11-039035 | A | 2/1999 |
| JP | 2002-307337 | A | 10/2002 |
| JP | 2015-112688 | A | 6/2015 |
| JP | 2019-198905 | A | 11/2019 |
| JP | 2021-049642 | A | 4/2021 |
| JP | 2022-001386 | A | 1/2022 |
| RO | 134710 | * | 1/2021 |

* cited by examiner

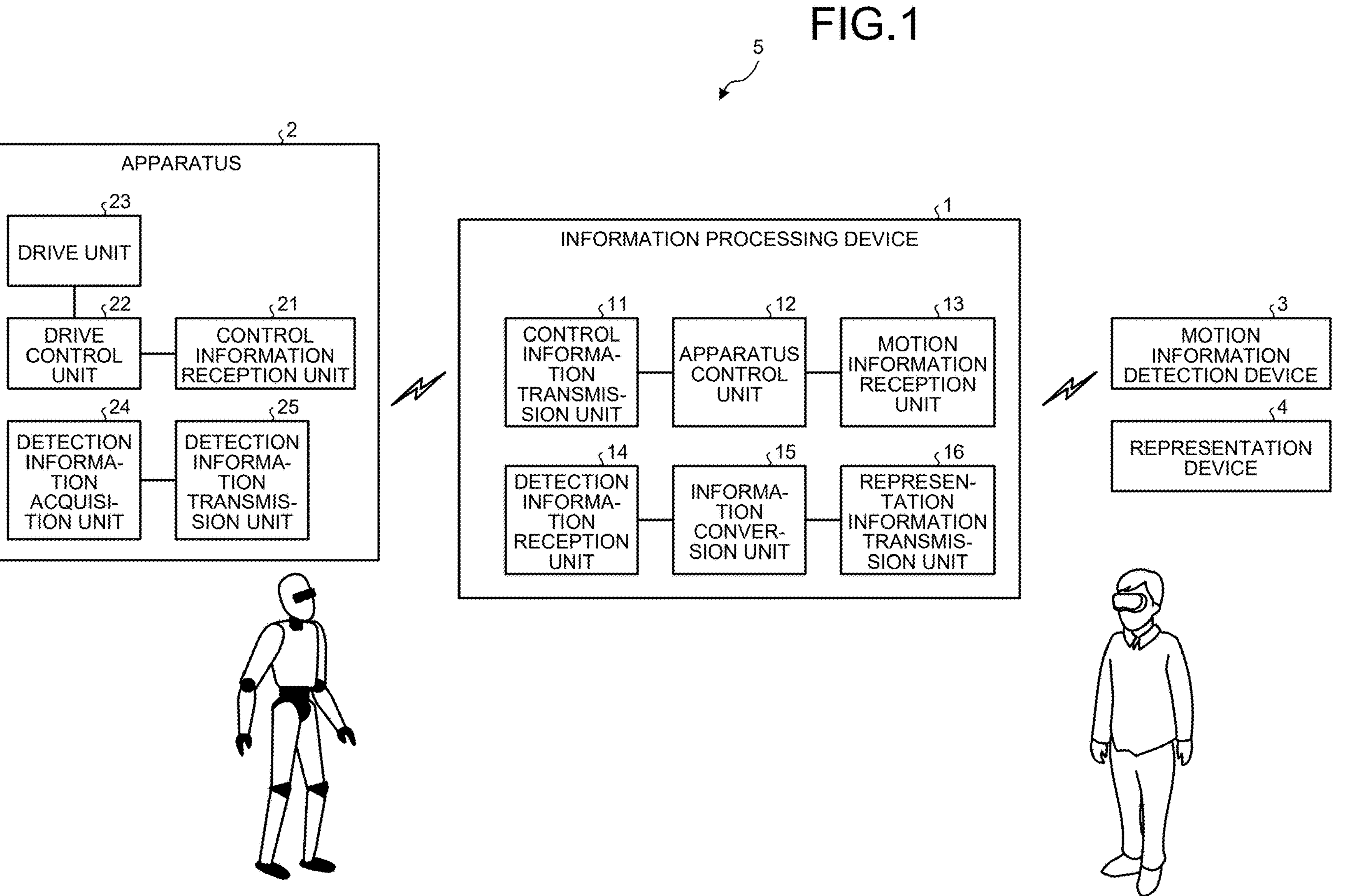
FIG.1
5
2
APPARATUS
23
DRIVE UNIT
22
DRIVE CONTROL UNIT
21
CONTROL INFORMATION RECEPTION UNIT
24
DETECTION INFORMATION ACQUISITION UNIT
25
DETECTION INFORMATION TRANSMISSION UNIT
1
INFORMATION PROCESSING DEVICE
11
CONTROL INFORMATION TRANSMISSION UNIT
12
APPARATUS CONTROL UNIT
13
MOTION INFORMATION RECEPTION UNIT
14
DETECTION INFORMATION RECEPTION UNIT
15
INFORMATION CONVERSION UNIT
16
REPRESENTATION INFORMATION TRANSMISSION UNIT
3
MOTION INFORMATION DETECTION DEVICE
4
REPRESENTATION DEVICE

FIG.2

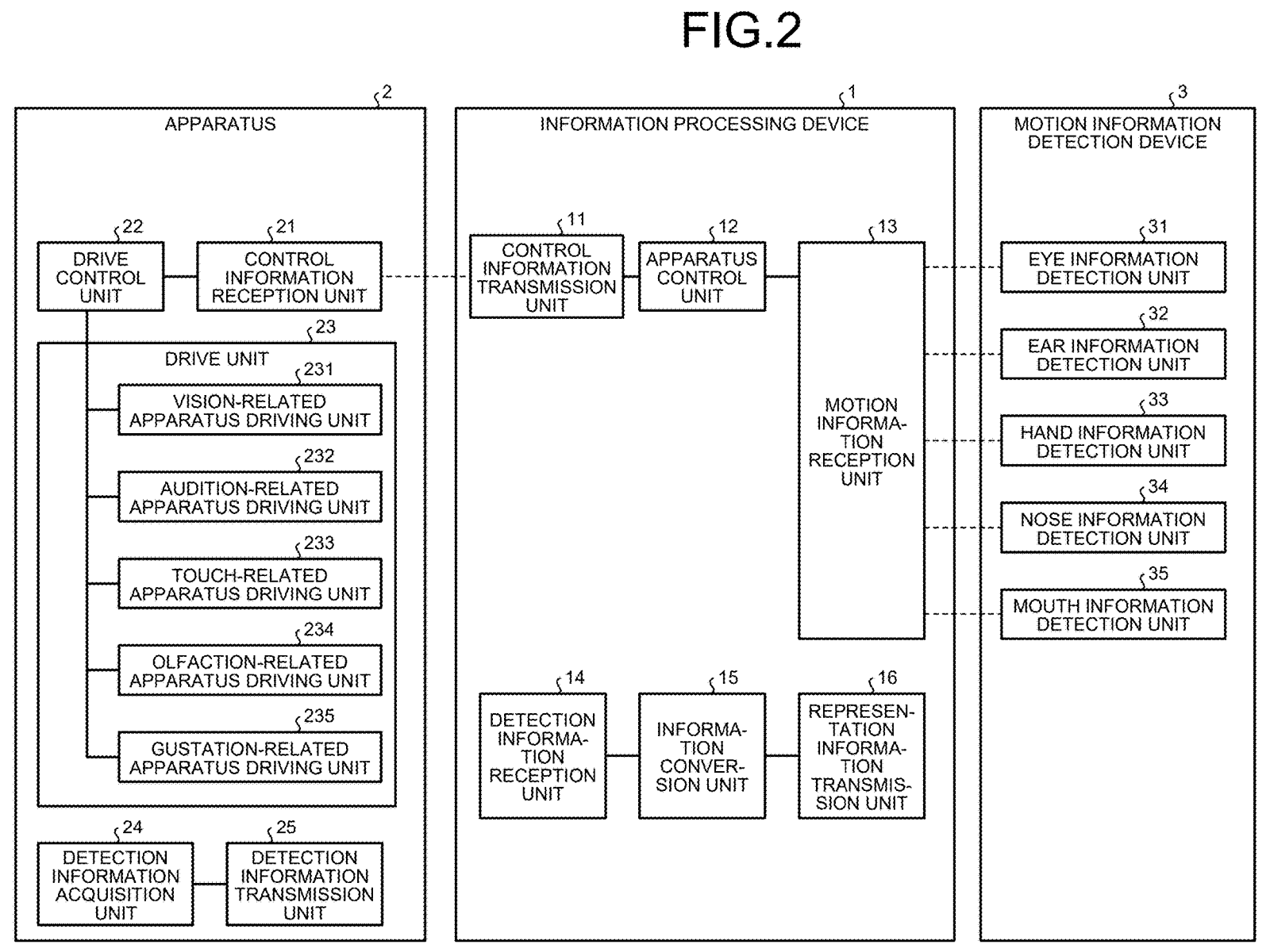

3 MOTION INFORMATION DETECTION DEVICE
31 EYE INFORMATION DETECTION UNIT
32 EAR INFORMATION DETECTION UNIT
33 HAND INFORMATION DETECTION UNIT
34 NOSE INFORMATION DETECTION UNIT
35 MOUTH INFORMATION DETECTION UNIT

1 INFORMATION PROCESSING DEVICE
13 MOTION INFORMATION RECEPTION UNIT
16 REPRESENTATION INFORMATION TRANSMISSION UNIT
12 APPARATUS CONTROL UNIT
15 INFORMATION CONVERSION UNIT
11 CONTROL INFORMATION TRANSMISSION UNIT
14 DETECTION INFORMATION RECEPTION UNIT

2 APPARATUS
21 CONTROL INFORMATION RECEPTION UNIT
22 DRIVE CONTROL UNIT
23 DRIVE UNIT
231 VISION-RELATED APPARATUS DRIVING UNIT
232 AUDITION-RELATED APPARATUS DRIVING UNIT
233 TOUCH-RELATED APPARATUS DRIVING UNIT
234 OLFACTION-RELATED APPARATUS DRIVING UNIT
235 GUSTATION-RELATED APPARATUS DRIVING UNIT
25 DETECTION INFORMATION TRANSMISSION UNIT
24 DETECTION INFORMATION ACQUISITION UNIT

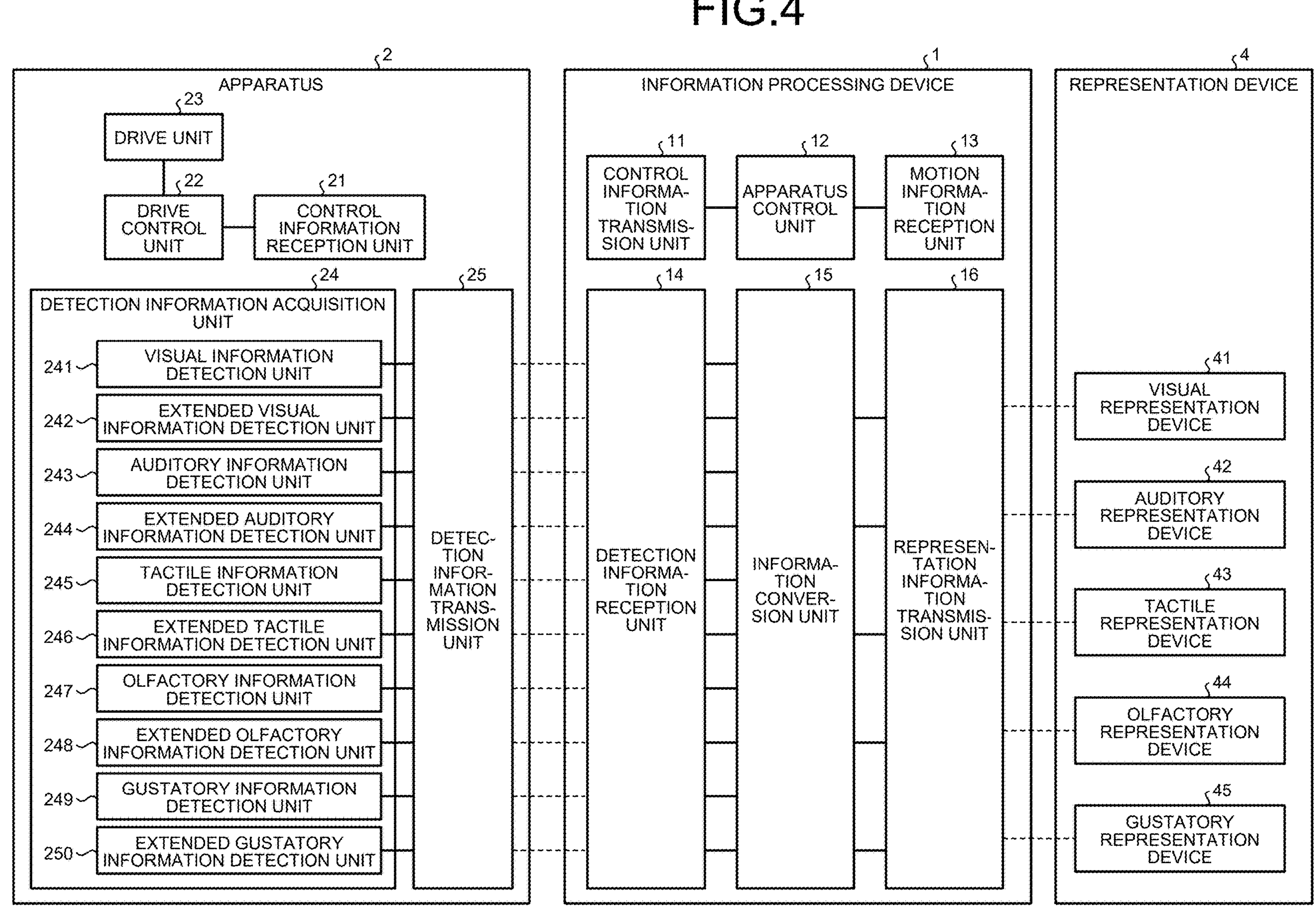
FIG.4
2
APPARATUS
23
DRIVE UNIT
22
DRIVE CONTROL UNIT
21
CONTROL INFORMATION RECEPTION UNIT
24
DETECTION INFORMATION ACQUISITION UNIT
241
VISUAL INFORMATION DETECTION UNIT
242
EXTENDED VISUAL INFORMATION DETECTION UNIT
243
AUDITORY INFORMATION DETECTION UNIT
244
EXTENDED AUDITORY INFORMATION DETECTION UNIT
245
TACTILE INFORMATION DETECTION UNIT
246
EXTENDED TACTILE INFORMATION DETECTION UNIT
247
OLFACTORY INFORMATION DETECTION UNIT
248
EXTENDED OLFACTORY INFORMATION DETECTION UNIT
249
GUSTATORY INFORMATION DETECTION UNIT
250
EXTENDED GUSTATORY INFORMATION DETECTION UNIT
25
DETEC-TION INFOR-MATION TRANS-MISSION UNIT
1
INFORMATION PROCESSING DEVICE
11
CONTROL INFORMA-TION TRANSMIS-SION UNIT
12
APPARATUS CONTROL UNIT
13
MOTION INFORMA-TION RECEPTION UNIT
14
DETECTION INFORMA-TION RECEPTION UNIT
15
INFORMA-TION CONVER-SION UNIT
16
REPRESEN-TATION INFORMA-TION TRANSMIS-SION UNIT
4
REPRESENTATION DEVICE
41
VISUAL REPRESENTATION DEVICE
42
AUDITORY REPRESENTATION DEVICE
43
TACTILE REPRESENTATION DEVICE
44
OLFACTORY REPRESENTATION DEVICE
45
GUSTATORY REPRESENTATION DEVICE

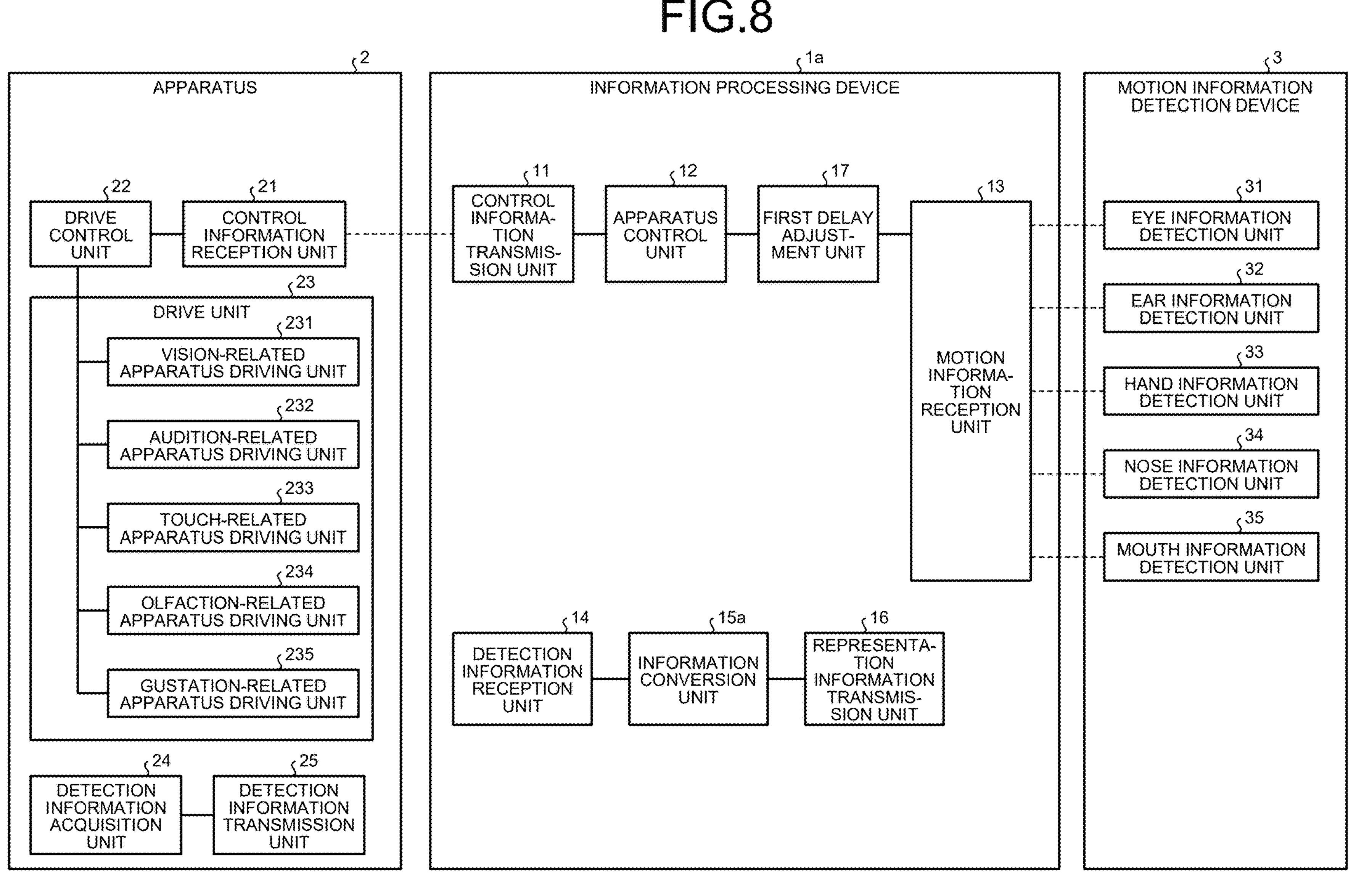
FIG.8
2
APPARATUS
22
DRIVE CONTROL UNIT
21
CONTROL INFORMATION RECEPTION UNIT
23
DRIVE UNIT
231
VISION-RELATED APPARATUS DRIVING UNIT
232
AUDITION-RELATED APPARATUS DRIVING UNIT
233
TOUCH-RELATED APPARATUS DRIVING UNIT
234
OLFACTION-RELATED APPARATUS DRIVING UNIT
235
GUSTATION-RELATED APPARATUS DRIVING UNIT
24
DETECTION INFORMATION ACQUISITION UNIT
25
DETECTION INFORMATION TRANSMISSION UNIT
1a
INFORMATION PROCESSING DEVICE
11
CONTROL INFORMA-TION TRANSMIS-SION UNIT
12
APPARATUS CONTROL UNIT
17
FIRST DELAY ADJUST-MENT UNIT
13
MOTION INFORMA-TION RECEPTION UNIT
14
DETECTION INFORMATION RECEPTION UNIT
15a
INFORMATION CONVERSION UNIT
16
REPRESENTA-TION INFORMATION TRANSMIS-SION UNIT
3
MOTION INFORMATION DETECTION DEVICE
31
EYE INFORMATION DETECTION UNIT
32
EAR INFORMATION DETECTION UNIT
33
HAND INFORMATION DETECTION UNIT
34
NOSE INFORMATION DETECTION UNIT
35
MOUTH INFORMATION DETECTION UNIT

INFORMATION PROCESSING DEVICE, MANIPULATION SYSTEM, INFORMATION PROCESSING METHOD, AND STORAGE MEDIUM

CROSS-REFERENCE TO RELATED APPLICATION

The present application is a national stage application, pursuant to 35 U.S.C. § 371, of International Patent Application No. PCT/JP2022/015047, filed Mar. 28, 2022, the entire contents of which are incorporated herein by reference.

FIELD

The present disclosure relates to an information processing device in a manipulation system for controlling an apparatus according to an operation of a user, to a manipulation system including this information processing device, to an information processing method, and to a program.

BACKGROUND

A manipulation system is known that enables a user to manipulate an apparatus such as a robot, from a location different from the location of the apparatus. For example, in Patent Literature 1, a sensor such as a camera or a microphone is provided at a location of installation of a robot, and information received from the sensor is replicated on the basis of that information to enable the user to perceive the information by sense of sight and/or sense of hearing of the user. The information is thus transferred to the user. The technology described in Patent Literature 1 thus enables a user at a location apart from the robot to remotely manipulate the robot with an awareness of the situation around the robot.

CITATION LIST

Patent Literature

Patent Literature 1: Japanese Patent Application Laid-open No. 2021-49642

SUMMARY OF INVENTION

Problem to be Solved by the Invention

The technology described in Patent Literature 1 generates, through replication, information equivalent to information perceivable by sense of sight and/or sense of hearing of a user who is a human and who is present at the location of the robot. From a viewpoint of increasing work efficiency or increasing a sense of presence, it is insufficient to replicate only information perceivable by the five senses of human in some cases.

The present disclosure has been made in view of the foregoing, and it is an object of the present disclosure to provide an information processing device that enables a user to perceive information that is unperceivable by the five senses of human.

Means to Solve the Problem

To solve the above problem and achieve an object, an information processing device according to the present disclosure includes: a detection information reception unit to receive five-sense information and extended five-sense information, the five-sense information being information at an apparatus, perceivable by at least one of five senses of human, the extended five-sense information being information at the apparatus, difficult to be perceived by the five senses of human, the apparatus being controlled according to a manipulation performed by a user at a location apart from the apparatus; and a conversion unit to convert the extended five-sense information into converted five-sense data, the converted five-sense data representing information perceivable by at least one of the five senses of human. Furthermore, the information processing device includes a combining unit to combine the converted five-sense data with the five-sense information corresponding to the converted five-sense data; and a representation information transmission unit to transmit combined data to a representation device, the representation device being to transfer the combined data to the user to enable the user to perceive the combined data by at least one of the five senses, the combined data being a result of combining performed by the combining unit.

Effects of the Invention

An information processing device according to the present disclosure provides an advantage in enabling a user to perceive information that is unperceivable by the five senses of human.

BRIEF DESCRIPTION OF DRAWINGS

FIG. 1 is a diagram illustrating an exemplary configuration of a manipulation system according to a first embodiment.

FIG. 2 is a diagram illustrating a detailed exemplary configuration relating to a remote manipulation process of the first embodiment.

FIG. 4 is a diagram illustrating a detailed exemplary configuration relating to an information transfer process of the first embodiment.

FIG. 8 is a diagram illustrating an exemplary configuration relating to remote manipulation control, of the manipulation system according to a second embodiment.

DESCRIPTION OF EMBODIMENTS

Figure 3:
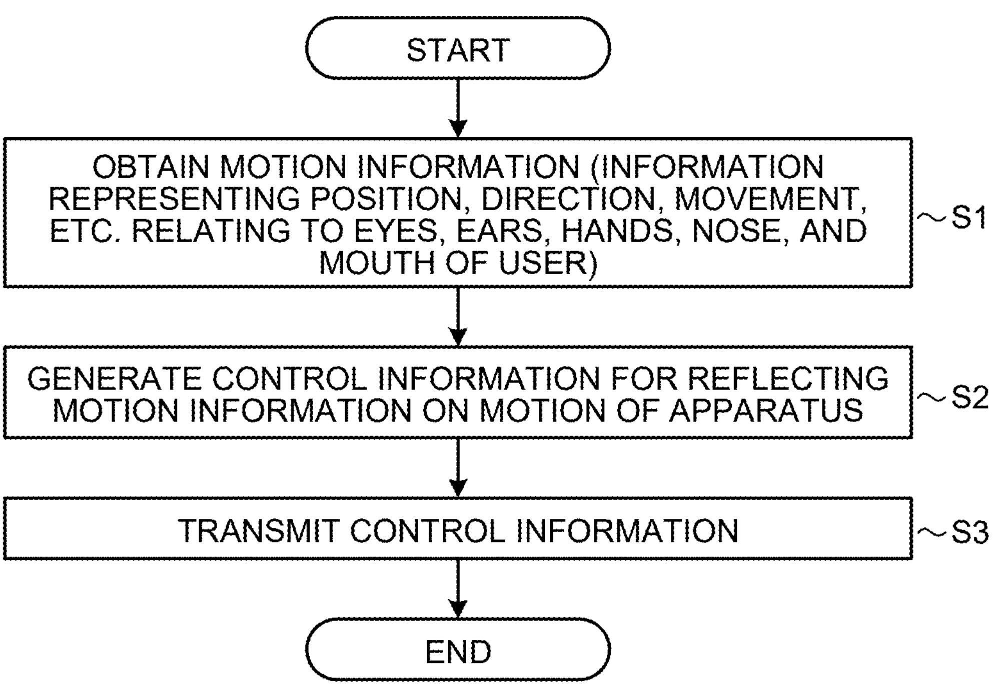
FIG. 3 is a flowchart illustrating an example of procedure of the remote manipulation process performed in an information processing device of the first embodiment.

An information processing device, a manipulation system, an information processing method, and a program according to embodiments will be described in detail below with reference to the drawings.

First Embodiment

FIG. 1 is a diagram illustrating an exemplary configuration of a manipulation system according to a first embodiment. A manipulation system 5 of the present embodiment includes an information processing device 1, an apparatus 2, a motion information detection device 3, and a representation device 4. The apparatus 2 includes movable parts and acts on the basis of control information sent from the information processing device 1. The apparatus 2 is, for example, a robot, a manipulator, a work machine, or the like. Although FIG. 1 illustrates a humanoid robot as an example of the apparatus 2 by way of example, the apparatus 2 is not limited to a humanoid robot.

The manipulation system 5 of the present embodiment is usable, for example, in works at locations where materials that are hazardous to humans are present, such as a rescue operation in disaster and dismantling operation of explosives; and in works at locations where a person has difficulty in working, such as work at height and work in a narrow space. Placing the apparatus 2 in these work sites and remotely manipulating the apparatus by a user from a location apart from the apparatus 2 enables the user to work safely. The manipulation system 5 can also be used by a user who is at a location apart from the apparatus 2 to manipulate the apparatus 2 in applications such as, for example, remote surgery and remote cooking. The manipulation system 5 is further usable in such as travel experience, nature experience, education using a remote environment and/or a remote tool. The above-mentioned applications for the manipulation system 5 of the present embodiment are by way of example, and the applications are not limited to the foregoing examples.

The motion information detection device 3 detects motion information, which is information about a motion of the user at a location apart from the apparatus 2, and transmits the motion information detected, to the information processing device 1. The motion information is information representing, for example, a position, a direction, and a movement of each of the eyes, ears, nose, hands, and mouth of the user. The motion information is used for causing the apparatus 2 to act according to a motion of the user. Note that it is not essential to obtain motion information for all the eyes, ears, nose, hands, and mouth, and there is no need to obtain unnecessary information depending on the configuration of the apparatus 2. For example, when the apparatus 2 includes no mechanism for simulating a movement of the mouth, no motion information relating to the mouth needs to be detected. In addition, as described later, the motion information detection device 3 includes one or more devices.

The apparatus 2 is controlled according to a manipulation performed by a user at a location apart from the apparatus 2. The apparatus 2 includes a control information reception unit 21, a drive control unit 22, a drive unit 23, a detection information acquisition unit 24, and a detection information transmission unit 25. The control information reception unit 21 receives control information from the information processing device 1, and outputs the control information received, to the drive control unit 22. The drive control unit 22 controls the drive unit 23 using the control information received from the control information reception unit 21. The detection information acquisition unit 24 detects five-sense information, and outputs the five-sense information detected, to the detection information transmission unit 25, where the five-sense information is information perceivable by the five senses of human. The five-sense information obtained by the detection information acquisition unit 24 is information perceivable by at least one of the five senses when the user is present at the location of the apparatus 2. That is, the five-sense information is information at the apparatus 2, perceivable by at least one of the five senses of human. The detection information acquisition unit 24 further detects extended five-sense information, and outputs the extended five-sense information detected, to the detection information transmission unit 25, where the extended five-sense information is information at the apparatus 2, difficult to be perceived by humans by the five senses. As described later, the extended five-sense information may also be information relating to each piece of the five-sense information, that is, information of extension of each of the five senses. The detection information transmission unit 25 transmits the five-sense information and the extended five-sense information to the information processing device 1. The drive control unit 22, the drive unit 23, and the detection information acquisition unit 24 will be described in detail later.

The extended five-sense information is, for example, information relating to a physical quantity similar, or analogous, to information perceivable by humans by the five senses, and is information outside a range perceivable by humans by the five senses. Examples of the extended five-sense information include information representing a result of detection of light outside the visible wavelength range, information representing a result of detection of a sound having a frequency outside the human audible range, information representing a level lower than a minimum value perceivable by humans, information representing a level larger than a maximum value perceivable by humans (e.g., sound that may cause rupture of the eardrum, or intense light that may damage the retina), information of a feature that cannot be separately detected by humans (e.g., the type of gas), and information relating to a location out of human sight. For example, as far as the sense of sight is concerned, visible light is perceivable by the five senses, meaning that a result of detection of visible light is information perceivable by the five senses, while information relating to types of light other than visible light, e.g., infrared light and UV light, is extended five-sense information difficult to be perceived by the five senses. The extended five-sense information can also be designated information beyond the five senses or information outside the five senses. The extended five-sense information will be described in detail later.

The representation device 4 provides representation that is perceivable by the user as information relating to at least one of the five senses, on the basis of representation information received from the information processing device 1 so as to thus provide the user with information detected by the detection information acquisition unit 24 of the apparatus 2. That is, the representation device 4 transfers the representation information received, to the user, to enable the user to perceive the representation information by at least one of the five senses. This enables the user to perceive the information at the location of the apparatus 2 using the five senses of the user. The user then acts on the basis of this information. This action of the user is detected by the motion information detection device 3 described above. Note that it is sufficient that the representation device 4 be capable of providing representation corresponding to at least one of the five senses, which are sense of sight, sense of hearing, sense of touch, sense of smell, and sense of taste. The representation device 4 will be described in detail later.

The information processing device 1 generates control information for controlling the apparatus 2, using the motion information received from the motion information detection device 3, and transmits the control information generated, to the apparatus 2. In addition, the information processing device 1 converts the extended five-sense information received from the apparatus 2 into five-sense data that can be perceived by the five senses of human, and combines the five-sense information received from the apparatus 2 and the five-sense data obtained by conversion. The information processing device 1 then generates, using five-sense information after combining, representation information for causing the representation device 4 to provide representation perceivable as information relating to at least one of the five senses. The information processing device 1 transmits the representation information generated, to the representation device 4.

As described above, the information processing device 1 of the present embodiment converts the extended five-sense information into five-sense data, combines the five-sense data with the five-sense information obtained, and provides the user with a result of combining. This enables information unperceivable by the five senses of human to be perceived by the user.

The information processing device 1 includes a control information transmission unit 11, an apparatus control unit 12, a motion information reception unit 13, a detection information reception unit 14, an information conversion unit 15, and a representation information transmission unit 16. The control information transmission unit 11, the apparatus control unit 12, and the motion information reception unit 13 together perform a remote manipulation process, which is a control operation to cause the apparatus 2 to act according to a motion of the user. The detection information reception unit 14, the information conversion unit 15, and the representation information transmission unit 16 together perform an information transfer process to transfer, to the user, the five-sense information and the extended five-sense information obtained by the detection information acquisition unit 24 of the apparatus 2. The remote manipulation process and the information transfer process will be separately described below.

FIG. 2 is a diagram illustrating a detailed exemplary configuration relating to a remote manipulation process of the present embodiment. The motion information detection device 3 includes an eye information detection unit 31, an ear information detection unit 32, a hand information detection unit 33, a nose information detection unit 34, and a mouth information detection unit 35. The eye information detection unit 31 detects a position, a direction, and a movement of each of the eyes of the user. The ear information detection unit 32 detects a position, a direction, and a movement of each of the ears of the user. The hand information detection unit 33 detects a position, a direction, and a movement of each of the hands and fingers of the user, and detects pressure at portions of the hands and fingers of the user. The nose information detection unit 34 detects a position, a direction, and a movement of the nose of the user. The mouth information detection unit 35 detects a position, a direction, and a movement of each of the mouth and tongue of the user. The eye information detection unit 31, the ear information detection unit 32, the hand information detection unit 33, the nose information detection unit 34, and the mouth information detection unit 35 include an imaging device such as, for example, a camera. The hand information detection unit 33 includes a pressure sensor. In addition, the eye information detection unit 31, the ear information detection unit 32, the nose information detection unit 34, and the mouth information detection unit 35 may detect the directions and positions of the eyes, ears, nose, and mouth using an imaging device for detecting the direction and position of the body of the user and the direction and position of the face of the user. The eye information detection unit 31, the ear information detection unit 32, the hand information detection unit 33, the nose information detection unit 34, and the mouth information detection unit 35 may be a device wearable by the user, or a camera or the like for imaging the user from the outside thereof. In addition, the motion information detection device 3 may include a positioning sensor attached to a device worn by the user.

Moreover, as illustrated in FIG. 2, the drive unit 23 of the apparatus 2 includes a plurality of apparatus driving units, examples of which are a vision-related apparatus driving unit 231, an audition-related apparatus driving unit 232, a touch-related apparatus driving unit 233, an olfaction-related apparatus driving unit 234, and a gustation-related apparatus driving unit 235. For example, when the apparatus 2 is a humanoid robot, the vision-related apparatus driving unit 231, the audition-related apparatus driving unit 232, the touch-related apparatus driving unit 233, the olfaction-related apparatus driving unit 234, and the gustation-related apparatus driving unit 235 are components respectively corresponding to the eyes, ears, nose, hands, and mouth of the robot.

FIG. 3 is a flowchart illustrating an example of procedure of the remote manipulation process performed in the information processing device 1 of the present embodiment. The motion information reception unit 13 of the information processing device 1 obtains motion information (i.e., information representing a position, a direction, a movement, and/or the like of each of the eyes, ears, hands, nose, and mouth of the user) (step S1). In more detail, the motion information reception unit 13 obtains the motion information through reception of a detection result from each of the eye information detection unit 31, the ear information detection unit 32, the hand information detection unit 33, the nose information detection unit 34, and the mouth information detection unit 35. The motion information reception unit 13 then outputs the motion information obtained, to the apparatus control unit 12.

The apparatus control unit 12 generates control information for reflecting the motion information on the motion of the apparatus (step S2). In more detail, the apparatus control unit 12 generates control information for controlling each of the vision-related apparatus driving unit 231, the audition-related apparatus driving unit 232, the touch-related apparatus driving unit 233, the olfaction-related apparatus driving unit 234, and the gustation-related apparatus driving unit 235 using respective corresponding pieces of the motion information received via the motion information reception unit 13 respectively from the eye information detection unit 31, the ear information detection unit 32, the hand information detection unit 33, the nose information detection unit 34, and the mouth information detection unit 35. That is, the apparatus control unit 12 generates pieces of control information respectively corresponding to the sense of sight, the sense of hearing, the sense of touch, the sense of smell, and the sense of taste to enable the vision-related apparatus driving unit 231, the audition-related apparatus driving unit 232, the touch-related apparatus driving unit 233, the olfaction-related apparatus driving unit 234, and the gustation-related apparatus driving unit 235 to simulate respective movements of the eyes, ears, nose, hands, and mouth of the user. The apparatus control unit 12 outputs the control information generated, to the control information transmission unit 11.

The control information transmission unit 11 transmits the control information (step S3). In more detail, the control information transmission unit 11 transmits, to the apparatus 2, the pieces of the control information respectively corresponding to the sense of sight, the sense of hearing, the sense of touch, the sense of smell, and the sense of taste, received from the apparatus control unit 12. The information processing device 1 performs steps S1 to S3 described above every remote-manipulation-control-interval. The remote-manipulation-control-interval may be the same as or different from the interval of acquisition of the motion information.

As described above, the motion information reception unit 13 receives motion information from the motion information detection device 3, and outputs the motion information received, to the apparatus control unit 12. That is, the motion information reception unit 13 obtains pieces of motion information representing the positions and actions of parts of the user, respectively corresponding to the multiple apparatus driving units of the apparatus. The apparatus control unit 12 uses the motion information received from the motion information detection device 3 to generate control information for causing the apparatus 2 to act correspondingly to the motion information. The apparatus control unit 12 then outputs the control information generated, to the control information transmission unit 11. In more detail, the apparatus control unit 12 generates, using the motion information, pieces of control information for controlling respective operations of the multiple apparatus driving units of the apparatus 2. The control information transmission unit 11 transmits the control information received from the apparatus control unit 12 to the apparatus 2.

The control information reception unit 21 of the apparatus 2 outputs the control information relating to the sense of sight, the sense of hearing, the sense of touch, the sense of smell, and the sense of taste to the drive control unit 22. The drive control unit 22 controls the vision-related apparatus driving unit 231, the audition-related apparatus driving unit 232, the touch-related apparatus driving unit 233, the olfaction-related apparatus driving unit 234, and the gustation-related apparatus driving unit 235 using respective corresponding pieces of the control information respectively relating to the sense of sight, the sense of hearing, the sense of touch, the sense of smell, and the sense of taste. This enables the apparatus 2 to simulate movements of the eyes, ears, nose, hands, and mouth of the user. That is, the movements of the eyes, ears, nose, hands, and mouth of the user are processed into manipulation information that represents details of the manipulation for determining an action of the apparatus 2, thereby providing remote manipulation of the apparatus 2.

Note that, as described above, the apparatus 2 is not limited to a humanoid robot; the apparatus 2 does not need to simulate all of the eyes, ears, nose, hands, and mouth, or there is no need to obtain unnecessary type of motion information depending on the configuration of the apparatus 2. In addition, an example has been described in which the motion of the user is directly used for manipulation, but the method of manipulation is not limited thereto. For example, manipulation means such as a lever, a touchpad, or a button for manipulating a motion of the apparatus 2 may be additionally provided to allow the user to operate the manipulation means to thus remotely manipulate the apparatus 2.

FIG. 4 is a diagram illustrating a detailed exemplary configuration relating to the information transfer process of the present embodiment. As illustrated in FIG. 4, the detection information acquisition unit 24 of the apparatus 2 includes a visual information detection unit 241, an extended visual information detection unit 242, an auditory information detection unit 243, an extended auditory information detection unit 244, a tactile information detection unit 245, an extended tactile information detection unit 246, an olfactory information detection unit 247, an extended olfactory information detection unit 248, a gustatory information detection unit 249, and an extended gustatory information detection unit 250.

The visual information detection unit 241 detects visual information, which is information perceivable by humans by the sense of sight. The visual information detection unit 241 can be, for example, a visible light camera or the like. The extended visual information detection unit 242 detects extended visual information, which is information relating to the sense of sight and difficult to be perceived by humans by the five senses. The extended visual information is, for example, a video of view outside human sight or a result of detection of light having a wavelength outside the wavelengths of visible light. The extended visual information detection unit 242 may be, for example, an infrared camera, a temperature sensor, or an ultraviolet camera, each of which obtains light having a wavelength other than the wavelengths of visible light in a form of an image; or a backward camera, a high-sensitivity camera, or the like for capturing an image in a direction invisible by humans such as a backward direction or a distant place.

The auditory information detection unit 243 detects auditory information, which is information perceivable by humans by the sense of hearing. The auditory information detection unit 243 can be, for example, a microphone (mike) or the like. The extended auditory information detection unit 244 detects extended auditory information, which is information relating to the sense of hearing and difficult to be perceived by humans by the five senses. The extended auditory information is, for example, information relating to a sound that is difficult to be perceived by humans. The extended auditory information detection unit 244 detects a sound having a frequency outside the human audible range and/or a sound having a low amplitude undetectable by humans. The extended auditory information detection unit 244 is, for example, a high-sensitivity microphone, a wide-band microphone, or the like.

The tactile information detection unit 245 detects tactile information, which is information perceivable by humans by the sense of touch. The tactile information detection unit 245 can be, for example, a pressure sensor or the like. The extended tactile information detection unit 246 detects extended tactile information, which is information relating to the sense of touch and difficult to be perceived by humans by the five senses. The extended tactile information is, for example, information representing at least one of vibration, pressure, airflow, and an inclination difficult to be detected by humans. The extended tactile information detection unit 246 detects, for example, a very small vibration and/or a very small atmospheric pressure variation (airflow), unperceivable by humans. The extended tactile information detection unit 246 is, for example, a high-sensitivity vibration sensor or the like.

The olfactory information detection unit 247 detects olfactory information, which is information perceivable by humans by the sense of smell. The olfactory information detection unit 247 can be, for example, an smell sensor or the like. The extended olfactory information detection unit 248 detects extended olfactory information, which is information relating to the sense of smell and difficult to be perceived by humans by the five senses. The extended olfactory information is, for example, information relating to a smell that is difficult to be perceived by humans. The extended olfactory information detection unit 248 can be a high-sensitivity smell sensor, a gas sensor, or the like.

The gustatory information detection unit 249 detects gustatory information, which is information perceivable by humans by the sense of taste. The gustatory information detection unit 249 can be, for example, a taste sensor or the like. The extended gustatory information detection unit 250 detects extended gustatory information, which is information relating to the sense of taste and difficult to be perceived by humans by the five senses. The extended gustatory information is, for example, information related to a taste that is difficult to be perceived by humans. The extended gustatory information detection unit 250 can be a high-sensitivity gustatory sensor or the like.

Note that the example illustrated in FIG. 4 has been described in which the detection information acquisition unit 24 includes the visual information detection unit 241, the extended visual information detection unit 242, the auditory information detection unit 243, the extended auditory information detection unit 244, the tactile information detection unit 245, the extended tactile information detection unit 246, the olfactory information detection unit 247, the extended olfactory information detection unit 248, the gustatory information detection unit 249, and the extended gustatory information detection unit 250; however, the detection information acquisition unit 24 does not need to include all of these units depending on the application. It is sufficient that the detection information acquisition unit 24 include at least one of the visual information detection unit 241, the auditory information detection unit 243, the tactile information detection unit 245, the olfactory information detection unit 247, and the gustatory information detection unit 249, and include at least one of the extended visual information detection unit 242, the extended auditory information detection unit 244, the extended tactile information detection unit 246, the extended olfactory information detection unit 248, and the extended gustatory information detection unit 250. That is, it is sufficient that the detection information acquisition unit 24 detect five-sense information that is at least one of the visual information, the auditory information, the tactile information, the olfactory information, and the gustatory information described above, and detect extended five-sense information that is at least one of the extended visual information, the extended auditory information, the extended tactile information, the extended olfactory information, and the extended gustatory information described above. In other words, the detection information acquisition unit 24 includes a five-sense information acquisition unit that obtains five-sense information, and an extended five-sense information acquisition unit that obtains extended five-sense information. In the example illustrated in FIG. 4, the five-sense information acquisition unit includes the visual information detection unit 241, the auditory information detection unit 243, the tactile information detection unit 245, the olfactory information detection unit 247, and the gustatory information detection unit 249, and the extended five-sense information acquisition unit includes the extended visual information detection unit 242, the extended auditory information detection unit 244, the extended tactile information detection unit 246, the extended olfactory information detection unit 248, and the extended gustatory information detection unit 250.

In addition, as illustrated in FIG. 4, the representation device 4 includes a visual representation device 41, an auditory representation device 42, a tactile representation device 43, an olfactory representation device 44, and a gustatory representation device 45.

The visual representation device 41 is a display device such as a display that can display a video, and is, for example, but not limited to, a three-dimensional display, virtual reality (VR) goggles, a VR head-mounted display, an eyeglass-type display, or the like. The auditory representation device 42 is a device that emits a sound, and is, for example, a speaker, which may be a 360-degree speaker or the like. The tactile representation device 43 is a device that produces pressure, and is, for example, a tactile glove, a haptic glove, or the like. The olfactory representation device 44 is a device that produces a smell, and is, for example, an odor-producing device. The gustatory representation device 45 is a device that produces a taste, and is, for example, a taste generation device to be worn in the oral cavity, on the jaw, on the hand, or elsewhere.

Note that the example illustrated in FIG. 4 has been described in which the representation device 4 includes the visual representation device 41, the auditory representation device 42, the tactile representation device 43, the olfactory representation device 44, and the gustatory representation device 45; however, the representation device 4 does not need to include all of these components depending on the application. It is sufficient that the representation device 4 include at least one of the visual representation device 41, the auditory representation device 42, the tactile representation device 43, the olfactory representation device 44, and the gustatory representation device 45.

Figure 5:
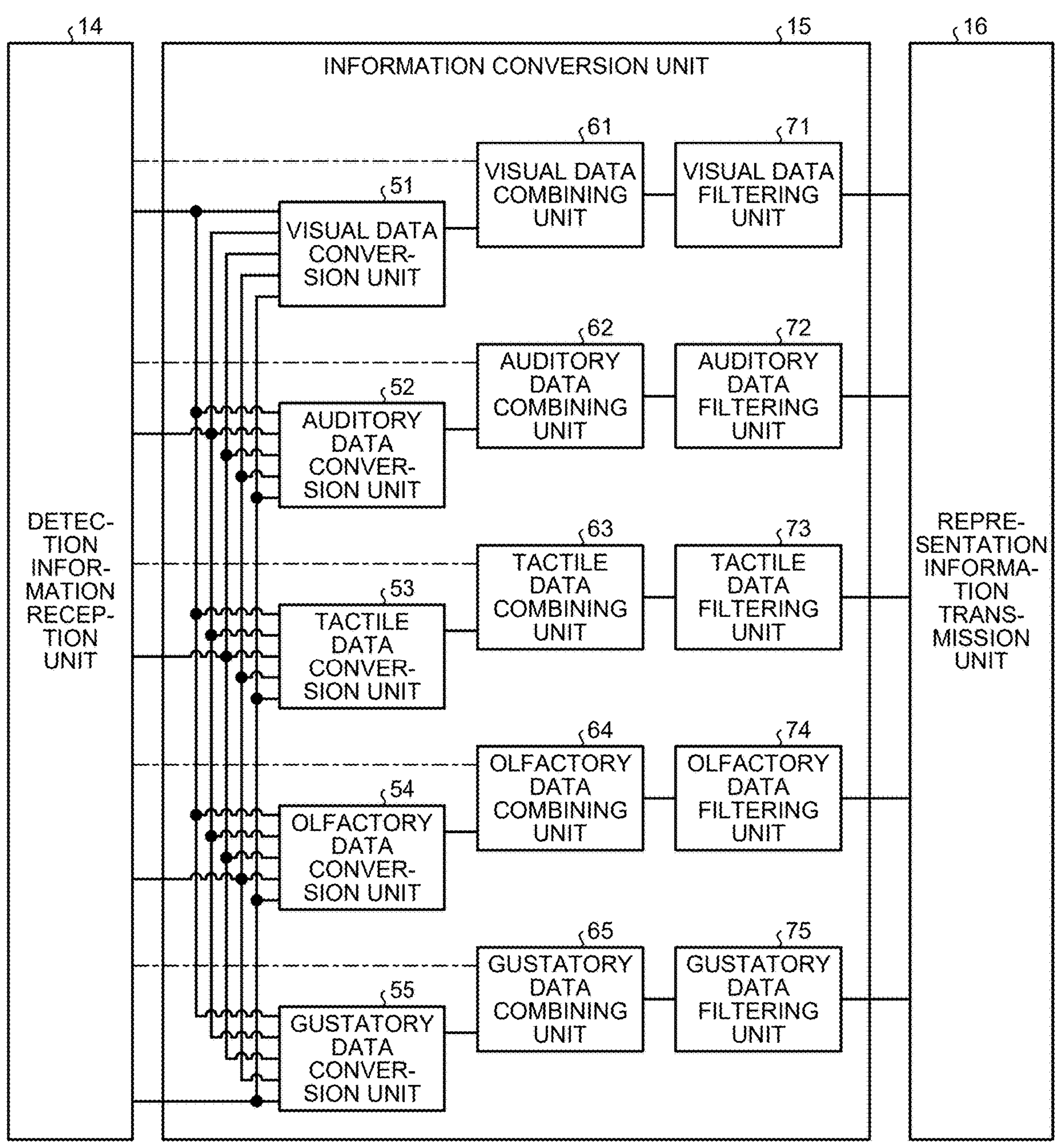
FIG. 5 is a diagram illustrating an exemplary configuration of an information conversion unit in the information processing device of the first embodiment.

FIG. 5 is a diagram illustrating an exemplary configuration of the information conversion unit 15 in the information processing device 1 of the present embodiment. The information conversion unit 15 includes, as illustrated in FIG. 5, a visual data conversion unit 51, an auditory data conversion unit 52, a tactile data conversion unit 53, an olfactory data conversion unit 54, a gustatory data conversion unit 55, a visual data combining unit 61, an auditory data combining unit 62, a tactile data combining unit 63, an olfactory data combining unit 64, a gustatory data combining unit 65, a visual data filtering unit 71, an auditory data filtering unit 72, a tactile data filtering unit 73, an olfactory data filtering unit 74, and a gustatory data filtering unit 75.

The visual data conversion unit 51, the auditory data conversion unit 52, the tactile data conversion unit 53, the olfactory data conversion unit 54, and the gustatory data conversion unit 55 are each an example of a conversion unit that converts extended five-sense information into converted five-sense data (five-sense data), which represents information perceivable by at least one of the five senses of human. The visual data combining unit 61, the auditory data combining unit 62, the tactile data combining unit 63, the olfactory data combining unit 64, and the gustatory data combining unit 65 are each an example of a combining unit that combines a piece of the five-sense data with a corresponding piece of the five-sense information. The visual data filtering unit 71, the auditory data filtering unit 72, the tactile data filtering unit 73, the olfactory data filtering unit 74, and the gustatory data filtering unit 75 are each an example of a filtering unit that filters data obtained by combining.

Note that although FIG. 5 illustrates an example of performing processing associated with all the five senses, part of the components of the information conversion unit 15 illustrated in FIG. 5 may be not included depending on the configuration of the detection information acquisition unit 24 and on the configuration of the representation device 4. For example, when the gustatory representation device 45 is not included, there is no need to include the gustatory data conversion unit 55, the gustatory data combining unit 65, or the gustatory data filtering unit 75.

Figure 6:
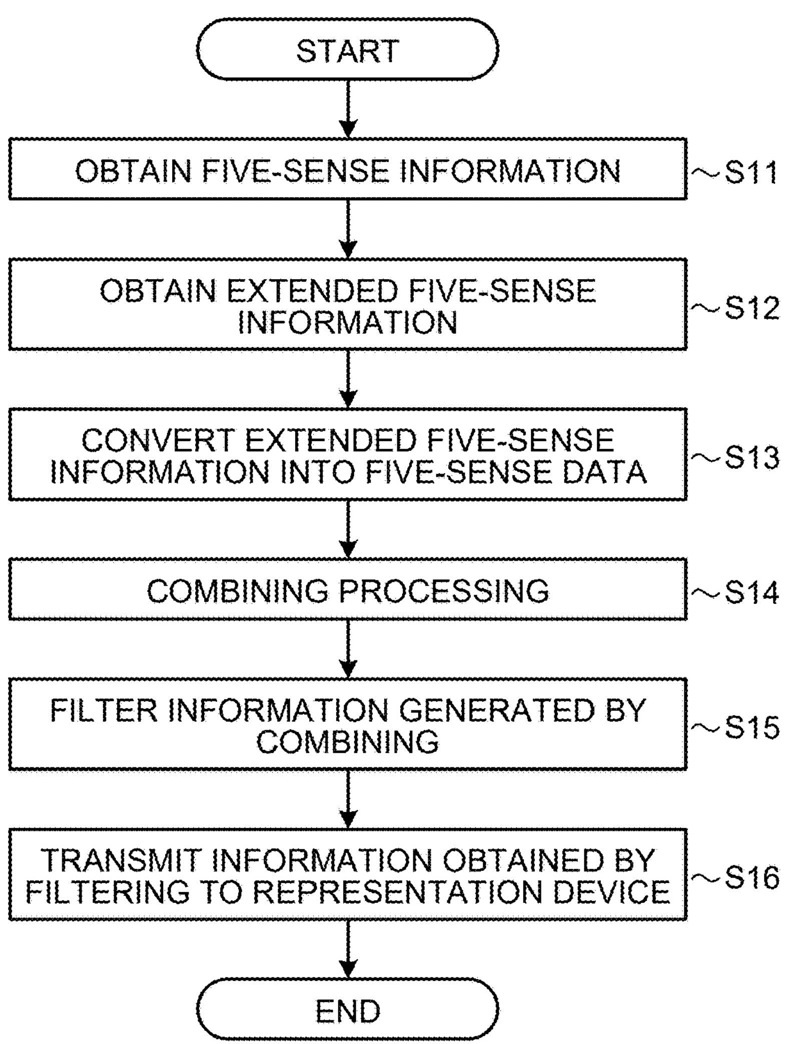
FIG. 6 is a flowchart illustrating an example of procedure of the information transfer process performed in the information processing device of the first embodiment.

FIG. 6 is a flowchart illustrating an example of procedure of the information transfer process performed in the information processing device 1 of the present embodiment. As illustrated in FIG. 6, the information processing device 1 obtains the five-sense information (step S11). In more detail, the detection information reception unit 14 receives, from the apparatus 2, each of visual information, auditory information, tactile information, olfactory information, and gustatory information perceivable by humans by the five senses, and outputs, to the information conversion unit 15, the visual information, the auditory information, the tactile information, the olfactory information, and the gustatory information that have been received. The information processing device 1 also obtains the extended five-sense information (step S12). In more detail, the detection information reception unit 14 receives, from the apparatus 2, each of extended visual information, extended auditory information, extended tactile information, extended olfactory information, and extended gustatory information difficult to be perceived by humans by the five senses, and outputs, to the information conversion unit 15, the extended visual information, the extended auditory information, the extended tactile information, the extended olfactory information, and the extended gustatory information that have been received. The sequence of performing step S11 and step S12 is not limited to the sequence of FIG. 6, but may be opposite, or step S11 and step S12 may be performed simultaneously.

Next, the information conversion unit 15 converts the extended five-sense information into five-sense data (step S13). The five-sense data is at least one of visual data, auditory data, tactile data, olfactory data, and gustatory data perceivable by humans by the five senses.

In more detail, the visual data conversion unit 51 converts at least one of the extended visual information, the extended auditory information, the extended tactile information, the extended olfactory information, and the extended gustatory information into visual data perceivable by humans by the sense of sight, and outputs the visual data obtained by conversion, to the visual data combining unit 61. The auditory data conversion unit 52 converts at least one of the extended visual information, the extended auditory information, the extended tactile information, the extended olfactory information, and the extended gustatory information into auditory data perceivable by humans by the sense of hearing, and outputs the auditory data obtained by conversion, to the auditory data combining unit 62. The tactile data conversion unit 53 converts at least one of the extended visual information, the extended auditory information, the extended tactile information, the extended olfactory information, and the extended gustatory information into tactile data perceivable by humans by the sense of touch, and outputs the tactile data obtained by conversion, to the tactile data combining unit 63. The olfactory data conversion unit 54 converts at least one of the extended visual information, the extended auditory information, the extended tactile information, the extended olfactory information, and the extended gustatory information into olfactory data perceivable by humans by the sense of smell, and outputs the olfactory data obtained by conversion, to the olfactory data combining unit 64. The gustatory data conversion unit 55 converts at least one of the extended visual information, the extended auditory information, the extended tactile information, the extended olfactory information, and the extended gustatory information into gustatory data perceivable by humans by the sense of taste, and outputs the gustatory data obtained by conversion, to the gustatory data combining unit 65.

The extended five-sense information may be converted into the five-sense data in such a manner that the extended five-sense information of a certain sense of the five senses is converted into five-sense data of the same type of sense as in a case where, for example, the visual data conversion unit 51 converts extended visual information into visual data, or in such a manner that the extended five-sense information of a certain sense of the five senses is converted into five-sense data of another type of sense of the five senses as in a case where, for example, the visual data conversion unit 51 converts extended gustatory information into visual data. Moreover, the five-sense data may be generated using multiple types of information as in a case where the visual data conversion unit 51 converts multiple types of information among the extended visual information, the extended auditory information, the extended tactile information, the extended olfactory information, and the extended gustatory information, into visual data. Furthermore, one type of the extended five-sense information may be converted into multiple types of the five-sense data as in a case where extended auditory information is converted into visual data and auditory data.

Next, the information conversion unit 15 performs combining processing (step S14). In more detail, the visual data combining unit 61 combines the visual data obtained by conversion and the visual information obtained at step S11, and outputs information generated by combining (combined data), to the visual data filtering unit 71. The auditory data combining unit 62 combines the auditory data obtained by conversion and the auditory information obtained at step S11, and outputs information generated by combining, to the auditory data filtering unit 72. The tactile data combining unit 63 combines the tactile data obtained by conversion and the tactile information obtained at step S11, and outputs information generated by combining, to the tactile data filtering unit 73. The olfactory data combining unit 64 combines the olfactory data obtained by conversion and the olfactory information obtained at step S11, and outputs information generated by combining, to the olfactory data filtering unit 74. The gustatory data combining unit 65 combines the gustatory data obtained by conversion and the gustatory information obtained at step S11, and outputs information generated by combining, to the gustatory data filtering unit 75.

Next, the information conversion unit 15 filters the information generated by combining (step S15). In more detail, the visual data filtering unit 71, the auditory data filtering unit 72, the tactile data filtering unit 73, the olfactory data filtering unit 74, and the gustatory data filtering unit 75 each perform a filtering operation depending on a value of the combined data (i.e., information generated by combining), which is a result of combining performed by a corresponding one of the combining units. For example, when the information generated by combining has an excessively high value, that is, an excessively high intensity of a representation to be provided to the user, an adverse effect may be caused on the user. It is possible to prevent an adverse effect on the user by performing a filtering operation.

Examples of the filtering operation include, for example, an operation in which when the value of the information generated by combining, used as the input value, is greater than a predetermined fixed value, the input value is converted to a smaller value, which is then output; and an operation in which when the input value is greater than the fixed value, a predetermined value (including 0) less than or equal to the fixed value is output. Alternatively, when the input value is small, the filtering operation may be performed in such a manner that the input value is multiplied by a value greater than 1 to output a value greater than the input value. For example, the filtering operation may include an operation of multiplying the input value by a gain dependent on the input value, i.e., the value of the combined data. In this case, the gain may be determined such that, for example, when the input value is less than or equal to a first value, the gain is a value greater than 1, and when the input value is greater than a second value, which is greater than the first value, the gain is a value less than 1. That is, the filtering operation may be performed in such a manner that, for example, when the input value is less than or equal to a first value, the input value is multiplied by a value G1 (G1>1); when the input value is greater than the first value and less than or equal to a second value (second value>first value), the input value is output without a change; and when the input value is greater than the second value, the input value is multiplied by a value G2 (G2<1).

Alternatively, the range of the input value may be divided into four or more ranges, and the value (gain) to be used as the multiplier may be determined on a per-range basis. Still alternatively, an output value may be formulated using a nonlinear function of the input value, and an operation of outputting a function value corresponding to the function may be performed as the filtering operation. The specific filtering operation is not limited to these examples.

Next, the information processing device 1 transmits information obtained by filtering, to the representation device 4 (step S16). In more detail, the visual data filtering unit 71, the auditory data filtering unit 72, the tactile data filtering unit 73, the olfactory data filtering unit 74, and the gustatory data filtering unit 75 output the information obtained by filtering, to the representation information transmission unit 16 as respective types of the representation information (i.e., visual representation information, auditory representation information, tactile representation information, olfactory representation information, and gustatory representation information). The representation information transmission unit 16 transmits the visual representation information, the auditory representation information, the tactile representation information, the olfactory representation information, and the gustatory representation information to the respective corresponding ones of the visual representation device 41, the auditory representation device 42, the tactile representation device 43, the olfactory representation device 44, and the gustatory representation device 45.

The information processing device 1 performs the foregoing information transfer process every information-transfer-control-interval. The information-transfer-control-interval may be the same as or different from the interval of acquisition of the five-sense information and the extended five-sense information. In addition, the information-transfer-control-interval may be the same as or different from the remote-manipulation-control-interval.

The visual representation device 41, the auditory representation device 42, the tactile representation device 43, the olfactory representation device 44, and the gustatory representation device 45 each provide a representation respectively on the basis of the visual representation information, the auditory representation information, the tactile representation information, the olfactory representation information, and the gustatory representation information, thereby enabling the user to perceive these types of information by the five senses. As described above, the five-sense information perceivable by humans is combined with the extended five-sense information unperceivable by humans in additional processing in the present embodiment, thereby enabling the user to be aware of the state and the surrounding situation of the apparatus 2 more specifically than when only the five-sense information is transferred. This can reduce an incongruous feeling of the user in remote manipulation, and allows the user to manipulate intuitively, thereby enabling improvement of work efficiency. In addition, since the user becomes aware of the state and the surrounding situation of the apparatus 2 more specifically, the user can perform more suitable manipulation, thereby enabling improvement of work efficiency. Moreover, the filtering operation enables the user to perform safe remote manipulation without harm to the user.

Specific examples of the extended five-sense information and the five-sense data will be given below. Note that details of the extended five-sense information and the five-sense data are not limited to the following examples.

Example 1: A very faint sound inaudible by humans, such as a sound of gas leak, is detected as extended auditory information, and the extended auditory information is converted into visual data to thus enable the user to perceive the gas leak. For example, the visual data may be provided by a text representing an alert such as "gas leak occurred", or a gas leak may be indicated by an image or a video. Note that the specific text of alert display is not limited to this example. When gas leak is indicated by an image or a video, the direction of the gas sound (gas source) may be indicated by a color and/or an arrow, for example. In addition, the visual data may be determined in such a manner that a test is preliminarily performed, and machine learning is then performed to learn what visual data will allow people to imagine a situation corresponding to a very faint sound depending on the type of such sound; and the information conversion unit 15 determines the visual data using a learned model. Alternatively, conversion correspondence may be predetermined in a rule-based manner rather than using machine learning.

Example 2: A very faint voice inaudible by humans, such as a voice of a person under wreckage calling for help, is detected as extended auditory information, and the extended auditory information is converted into auditory data corresponding to a loud voice perceivable by humans to thus enable the user to perceive the very faint voice.

Example 3: A very faint odor unperceivable by humans, such as an odor of almost odorless toxic gas, is detected as extended olfactory information, and the extended olfactory information is converted into auditory data of an alert sound perceivable by humans to thus enable the user to perceive the odorless toxic gas.

Example 4: A very faint odor unperceivable by humans, such as an odor of almost odorless toxic gas, is detected as extended olfactory information, and the extended olfactory information is converted into visual data perceivable by humans, such as a concentration distribution chart, to thus enable the user to infer the source of the odorless toxic gas.

Example 5: A temperature unperceivable by humans (e.g., ultra-high temperature) is detected as extended tactile information or extended visual information, and the extended tactile information or the extended visual information representing an ultra-high temperature portion is converted into visual data perceivable by humans, such as indication using a red color, to thus enable the user to perceive the ultra-high temperature portion.

Example 6: A video in a direction unperceivable by humans, such as a video showing a backward scene, is obtained as extended visual information, and the extended visual information is converted into visual data perceivable humans to thus enable the user to perceive the situation in the backward direction.

Example 7: A video showing a dark environment unperceivable by humans is obtained as extended visual information, and the extended visual information is intensified and converted into visual data perceivable by humans to thus enable the user to perceive a situation in a dark environment.

Example 8: An occurrence of very small force, such as a very small vibration (very small vibration of the ground or of a building (air) due to an explosive or aging degradation) or a very small atmospheric pressure variation (flow of airflow) unperceivable by humans, is detected as extended tactile information, and when the occurrence of very small force is detected in the extended tactile information, the extended tactile information is converted into auditory data representing an alert sound or the like to thus enable the user to perceive the occurrence of very small force.

Example 9: A delicate taste unperceivable by humans is detected as extended gustatory information, and the extended gustatory information is converted into auditory data such as a voice indicating a component forming the taste to thus enable the user to perceive the delicate taste.

Example 10: A faint inclination unperceivable by humans, such as a deviation from the gravitational direction or the horizontal direction, is detected as extended tactile information, and the extended tactile information is converted into visual data of a numerical value representing the inclination to thus enable the user to perceive the inclination. For example, when a robot that is the apparatus 2 is caused to perform a rescue effort, poor footing may hinder the operation due to a situation such as slippage or sinking. Accordingly, a device such as a visible light camera, an infrared camera, an acoustic wave sensor, a light detection and ranging (LiDAR) device, a pressure sensing sensor, or a gyroscope may be provided on the sole of a foot of the apparatus 2 as the extended tactile information detection unit 246 or the extended visual information detection unit 242 to enable detection of a condition (being inclined, brittle, or wet and slippery) of an object, or presence of a person, near the apparatus 2. This can prevent the apparatus 2 from stepping on a place where a person is present under wreckage near the feet of the apparatus 2 or in a similar situation.

Note that the information processing device 1 may determine into which type of five-sense data a specific type of extended five-sense information is to be converted depending on a value or a characteristic (e.g., temporal change or frequency) of that extended five-sense information, through machine learning or in a rule-based manner. For example, according to a characteristic or the like of a very faint sound, what sound is the very faint sound represented by the extended five-sense information is preliminarily learned through machine learning to generate a learned model, and the information processing device 1 obtains an inference of what sound the sound in question is by inputting the extended five-sense information to the learned model. The correspondence between the type of the sound (what sound the sound in question is) and the type of the five-sense data (i.e., one of visual data, auditory data, tactile data, olfactory data, and gustatory data) to be generated by conversion is predetermined in a rule-based manner, and the information processing device 1 determines the type of the five-sense data to be generated by conversion, according to the type of sound inferred. Alternatively, the correspondence between the type of sound and the type of the five-sense data may also be predetermined through machine learning. For example, a fact that by which type of five-sense data (i.e., which of visual data, auditory data, tactile data, olfactory data, and gustatory data) a person can more easily perceive a situation corresponding to a sound, may be preliminarily learned through machine learning using a result of a test etc. Alternatively, correspondence between a value or a characteristic of the extended five-sense information and the type of the five-sense data to be generated by conversion may be predetermined directly in a rule-based manner. In addition, a learned model for obtaining the type of the five-sense data from a value or a characteristic of the extended five-sense information, may be preliminarily generated.

Examples of effects of filtering will next be described. Note that details of the filtering operation are not limited to the following examples.

Filtering example 1 (sense of touch): When an explosion occurs to cause the apparatus 2 to suffer a strong impact during a disaster rescue operation, it is possible to prevent the impact from transmitting to the user with the actual intensity by reducing the intensity of or blocking of the impact by filtering.

Filtering example 2 (sense of hearing): When an explosion occurs to cause a loud explosion sound to be detected during a disaster rescue operation, it is possible to prevent providing the user with a loud explosion sound that may cause rupture of the eardrum by reducing the intensity of or blocking of the sound by filtering.

Filtering example 3 (sense of sight): When an explosion occurs to cause the apparatus 2 to be subjected to high-intensity light during a disaster rescue operation, it is possible to prevent providing the user with intense light that may have an adverse effect on the sense of sight by reducing the intensity of or blocking of the light by filtering.

Filtering example 4 (sense of smell): When the apparatus 2 is subjected to an intense unusual odor due to gas leak etc. during a disaster rescue operation, it is possible to prevent providing the user with an unusual odor that may damage the sense of smell by reducing the intensity of or blocking of the odor by filtering.

Filtering example 5 (sense of taste): When a robot that is the apparatus 2 performs a taste test during cooking, and suffers a taste that may affect the sense of taste, it is possible to prevent providing the user with a taste that may affect the sense of taste by reducing the intensity of or blocking of the taste by filtering.

Note that FIG. 1 illustrates an example in which communication between the apparatus 2 and the information processing device 1, communication between the information processing device 1 and the motion information detection device 3, and communication between the information processing device 1 and the representation device 4 are each wireless communication, but the communication is not limited thereto. The devices in the present embodiment may communicate with each other via wired communication or via both wired communication and wireless communication. In addition, the devices in the present embodiment may communicate with each other via a fifth generation (5G) or Beyond 5G mobile communication system. It is possible to transfer information without causing a strange feeling to the user by the use of a low-latency communication scheme such as Beyond 5G. For example, by use of a communication scheme with which delays are shorter than a temporal resolution of change in information that is perceivable by humans (e.g., about 10 to 30 milliseconds), it is possible to reduce a strange feeling of the user, and enable the user to efficiently manipulate the apparatus 2. In addition, use of a communication scheme imposing a short delay can increase a realistic feeling.

Figure 7:
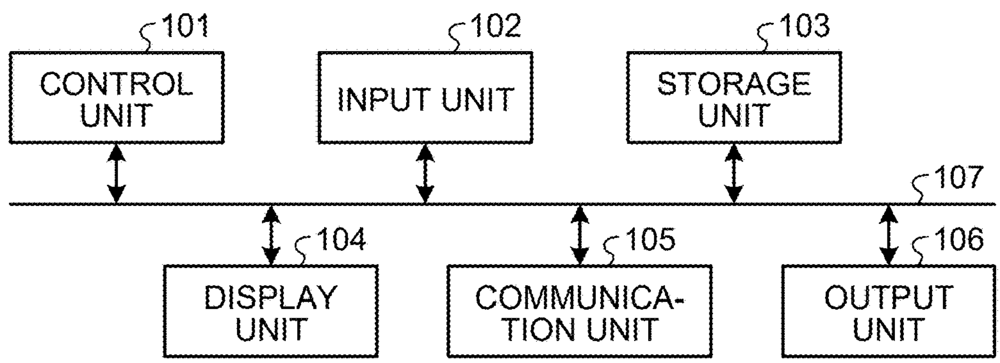
FIG. 7 is a diagram illustrating an exemplary configuration of a computer system that implements the information processing device of the first embodiment.

A hardware configuration of the information processing device 1 of the present embodiment will next be described. The information processing device 1 of the present embodiment is implemented in such a manner that a program is executed on a computer system to cause the computer system to function as the information processing device 1, where the program is a computer program that describes a process to be performed in the information processing device 1. FIG. 7 is a diagram illustrating an exemplary configuration of a computer system that implements the information processing device 1 of the present embodiment. As illustrated in FIG. 7, this computer system includes a control unit 101, an input unit 102, a storage unit 103, a display unit 104, a communication unit 105, and an output unit 106, which are connected to one another via a system bus 107. The control unit 101 and the storage unit 103 constitute processing circuitry.

In FIG. 7, the control unit 101 is, for example, a processor such as a central processing unit (CPU). The control unit 101 executes a program that describes a process to be performed in the information processing device 1 of the present embodiment. Note that the control unit 101 may be implemented partially in a dedicated hardware element such as a graphics processing unit (GPU) or a field-programmable gate array (FPGA). The input unit 102 includes, for example, a keyboard, a mouse, and/or the like. The input unit 102 is used by a user of the computer system to input various types of information. Examples of the storage unit 103 include various types of memories such as a random access memory (RAM) and a read only memory (ROM) and storage devices such as a hard disk. The storage unit 103 stores a program to be executed by the control unit 101 described above, necessary data obtained during a process, and the like. The storage unit 103 is also used as a temporary storage area relating to a program. The display unit 104 includes a display, a liquid crystal display (LCD) panel, and/or the like to display various types of screens to the user of the computer system. The communication unit 105 is a receiver and a transmitter that perform communication processing. The output unit 106 is a printer, a speaker, and/or the like. Note that FIG. 7 merely illustrates an example, and the configuration of the computer system is not limited to the configuration of the example of FIG. 7.

An exemplary operation of the computer system until a program of the present embodiment becomes executable will next be described. In a computer system configured as described above, a computer program is installed in the storage unit 103 from, for example, a compact disc (CD)-ROM or a digital versatile disc (DVD)-ROM placed in a CD-ROM drive or in a DVD-ROM drive (each not illustrated). Then, upon execution of the program, the program read from the storage unit 103 is stored in a main storage area of the storage unit 103. In this state, the control unit 101 performs processing that functions as the information processing device 1 of the present embodiment according to the program stored in the storage unit 103.

Note that the foregoing description has been described in which the program that describes a process to be performed in the information processing device 1 is provided using a CD-ROM or a DVD-ROM as a recording medium, but the method for providing the program is not limited thereto. A program provided, for example, via the communication unit 105 using a transmission medium such as the Internet may also be used depending on the configuration of the computer system, the size of the program to be provided, and/or the like.

The program of the present embodiment causes a computer system to perform, for example, a step of receiving five-sense information and extended five-sense information, a step of converting the extended five-sense information into converted five-sense data representing information perceivable by at least one of five senses of human, a step of generating combined data by combining the converted five-sense data with the five-sense information corresponding to the converted five-sense data, and a step of transmitting the combined data to the representation device 4, which transfers the combined data to the user to enable the user to perceive the combined data by at least one of the five senses.

The apparatus control unit 12 and the information conversion unit 15 illustrated in FIG. 1 are implemented in such a manner that a computer program stored in the storage unit 103 illustrated in FIG. 7 is executed by the control unit 101 illustrated in FIG. 7. The apparatus control unit 12 and the information conversion unit 15 illustrated in FIG. 1 are implemented also using the storage unit 103 illustrated in FIG. 7. The control information transmission unit 11, the motion information reception unit 13, the detection information reception unit 14, and the representation information transmission unit 16 illustrated in FIG. 1 are implemented in the communication unit 105 illustrated in FIG. 7. In addition, the information processing device 1 may be implemented in multiple computer systems. For example, the information processing device 1 may be implemented in a cloud computer system.

In addition, although the example illustrated in FIG. 1 has been described in which the information processing device 1 performs both the remote manipulation control and the information transfer control, a remote manipulation device that performs the remote manipulation control and an information transfer device that performs the information transfer control may be separately installed. In this case, the remote manipulation device includes the control information transmission unit 11, the apparatus control unit 12, and the motion information reception unit 13, while the information transfer device includes the detection information reception unit 14, the information conversion unit 15, and the representation information transmission unit 16.

As described above, in the present embodiment, the information processing device 1 in the manipulation system 5 for enabling a user to manipulate the apparatus 2 from a location apart from the apparatus 2 obtains extended five-sense information difficult to be perceived by humans as well as five-sense information perceivable by humans, converts the extended five-sense information into five-sense data perceivable by humans, and combines the five-sense data with the five-sense information. The information processing device 1 then transmits the information generated by combining, to the representation device 4, which transfers the information generated by combining to the user as information associated with the five senses, to thus transfer the information generated by combining to the user. This enables the user to perceive information unperceivable by the five senses of human.

Second Embodiment

FIG. 8 is a diagram illustrating an exemplary configuration relating to the remote manipulation control, of the manipulation system according to a second embodiment. The manipulation system of the present embodiment is similar to the manipulation system 5 of the first embodiment except including an information processing device 1*a* in place of the information processing device 1. Components having functionality similar to the functionality of the first embodiment are designated by reference characters the same as the reference characters used in the first embodiment, and duplicate description will be omitted. The following description will primarily describe differences from the first embodiment.

As illustrated in FIG. 8, the information processing device 1*a* is similar to the information processing device 1 of the first embodiment except additionally including a first delay adjustment unit 17 and including an information conversion unit 15*a* in place of the information conversion unit 15. The first delay adjustment unit 17 is a remote control delay adjustment unit that adjusts delays to cause operations to be performed simultaneously in the multiple apparatus driving units, where the operations are based on pieces of control information generated using respective pieces of motion information obtained at a same time. In more detail, the first delay adjustment unit 17 obtains motion information from each of the eye information detection unit 31, the ear information detection unit 32, the hand information detection unit 33, the nose information detection unit 34, and the mouth information detection unit 35 via the motion information reception unit 13, and calculates adjustment amounts of timings of driving the apparatus driving units in the apparatus 2 to synchronize these timings, where these timings respectively correspond to pieces of the motion information detected at a same time. The first delay adjustment unit 17 then instructs the apparatus control unit 12 to use the adjustment amounts calculated.

The apparatus control unit 12 adjusts, on the basis of the adjustment amounts, timings of outputting the pieces of the control information respectively corresponding to the vision-related apparatus driving unit 231, the audition-related apparatus driving unit 232, the touch-related apparatus driving unit 233, the olfaction-related apparatus driving unit 234, and the gustation-related apparatus driving unit 235. This enables the first delay adjustment unit 17 to adjust the delays to be introduced in the respective drive units respectively corresponding to the pieces of the motion information detected at a same time to thus provide synchronization. In addition, when multiple pieces of motion information are to be used in generating the control information, the first delay adjustment unit 17 synchronizes one another the multiple pieces of motion information corresponding to a same time, and outputs resultant multiple pieces of motion information to the apparatus control unit 12.

For example, the motion information obtained by the eye information detection unit 31, the ear information detection unit 32, the hand information detection unit 33, the nose information detection unit 34, and the mouth information detection unit 35 further includes time information representing the time of detection (i.e., time stamp). The first delay adjustment unit 17 determines the pieces of the motion information that correspond to a same time, using the time information in the pieces of the motion information. Note that times different from each other by a time difference less than or equal to a threshold are regarded herein as a same time. The first delay adjustment unit 17 determines that the latest time among the times at which the pieces of the motion information corresponding to a same time are received is a reference time, and calculates a time difference between the reference time and a time at which another piece of the motion information is received as the adjustment amount. The first delay adjustment unit 17 outputs these adjustment amounts to the apparatus control unit 12 to cause the apparatus control unit 12 to adjust, using the adjustment amounts, the timings of outputting the pieces of the control information for controlling the vision-related apparatus driving unit 231, the audition-related apparatus driving unit 232, the touch-related apparatus driving unit 233, the olfaction-related apparatus driving unit 234, and the gustation-related apparatus driving unit 235, to the control information transmission unit 11. Thus, the first delay adjustment unit 17 can adjust the delays from when respective pieces of information are respectively obtained by the eye information detection unit 31, the ear information detection unit 32, the hand information detection unit 33, the nose information detection unit 34, and the mouth information detection unit 35 until respective piece of the motion information are received by the information processing device 1*a* (i.e., delays in reception). Note that, in this example, the latest time among the times at which the pieces of the motion information corresponding to a same time are received is defined as the reference time, but the method of determining the reference time is not limited thereto.

Note that, for example, the eye information detection unit 31, the ear information detection unit 32, the hand information detection unit 33, the nose information detection unit 34, and the mouth information detection unit 35 use a same interval of acquisition of information, and the interval of acquisition and the remote-manipulation-control-interval are the same as each other; but these intervals are not limited as such. When the interval of acquisition is shorter than the remote-manipulation-control-interval, the apparatus control unit 12 generates the control information using information corresponding to one or multiple intervals of acquisition, received in a single remote-manipulation-control-interval. For example, the apparatus control unit 12 may generate the control information using an average value of information corresponding to multiple intervals of acquisition, or may generate the control information using the median or the like of information corresponding to the intervals of acquisition. In this case, the first delay adjustment unit 17 may adjust the delays using, for example, the average value of time information included in the information corresponding to multiple intervals of acquisition. Alternatively, when the interval of acquisition is greater than the remote-manipulation-control-interval, the apparatus control unit 12 may generate the control information using most recent information or using a value obtained by extrapolation performed using the most recent information and information corresponding to a time therebefore.

In addition, when the apparatus control unit 12 takes different processing times for generating the piece of control information for each of the vision-related apparatus driving unit 231, the audition-related apparatus driving unit 232, the touch-related apparatus driving unit 233, the olfaction-related apparatus driving unit 234, and the gustation-related apparatus driving unit 235, each processing delay time is obtained such that a difference between each processing time and the longest processing time among the processing times taken for these processing. The first delay adjustment unit 17 calculates each of the adjustment amounts by adding the processing delay time to the adjustment amount for a corresponding one of the delays in reception described above. Moreover, when the vision-related apparatus driving unit 231, the audition-related apparatus driving unit 232, the touch-related apparatus driving unit 233, the olfaction-related apparatus driving unit 234, and the gustation-related apparatus driving unit 235 further take different times to start operation from when the apparatus 2 receives the control information, these differences may also be taken into account as an adjustment amount similarly.

Note that although the example illustrated in FIG. 8 assumes that the first delay adjustment unit 17 is disposed upstream of the apparatus control unit 12, the configuration is not limited thereto. The first delay adjustment unit 17 may be disposed downstream of the apparatus control unit 12. In this case, each piece of the control information generated by the apparatus control unit 12 further includes time information about the time of detection of the motion information used for generating that piece of the control information, and the first delay adjustment unit 17 provides control, on the basis of the time information, to cause the pieces of the control information corresponding to respective pieces of the motion information detected simultaneously to be output simultaneously.

Figure 9:
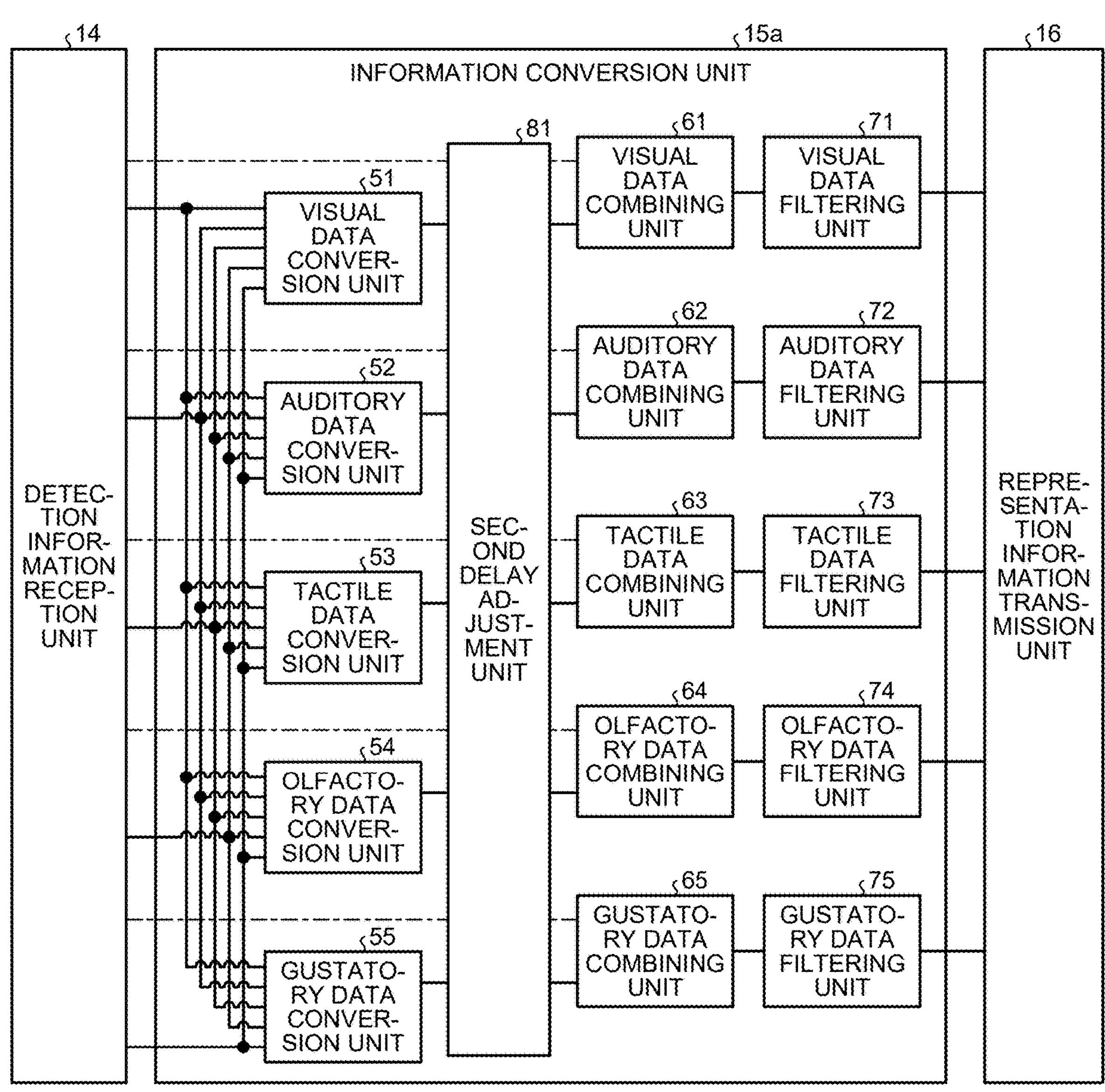
FIG. 9 is a diagram illustrating an exemplary configuration relating to information transfer control, of the manipulation system according to the second embodiment.

FIG. 9 is a diagram illustrating an exemplary configuration relating to the information transfer control, of the manipulation system according to the second embodiment. As illustrated in FIG. 9, the information conversion unit 15*a* of the information processing device 1*a* of the present embodiment is similar to the information conversion unit 15 of the first embodiment except additionally including a second delay adjustment unit 81.

The second delay adjustment unit 81 is an information transfer delay adjustment unit that adjusts delays to cause multiple respective pieces of combined data corresponding to the five-sense information and to the extended five-sense information obtained at a same time to be simultaneously transferred to the user by the multiple respective representation devices. In more detail, the second delay adjustment unit 81 obtains the five-sense information and the extended five-sense information via the detection information reception unit 14, and calculates adjustment amounts of delays to cause each piece of the five-sense information to be combined with a piece of five-sense data generated from a corresponding piece of the extended five-sense information detected at the same time as that piece of the five-sense information. The second delay adjustment unit 81 then instructs the visual data combining unit 61, the auditory data combining unit 62, the tactile data combining unit 63, the olfactory data combining unit 64, and the gustatory data combining unit 65 to use, as input information, the respective adjustment amounts calculated. The second delay adjustment unit 81 further calculates adjustment amounts (output adjustment amounts) to cause respective representations in the representation device 4 corresponding to the five-sense information and to the extended five-sense information detected at the same time to be simultaneously provided. The second delay adjustment unit 81 then instructs the visual data filtering unit 71, the auditory data filtering unit 72, the tactile data filtering unit 73, the olfactory data filtering unit 74, and the gustatory data filtering unit 75 to use the respective output adjustment amounts calculated. The visual data filtering unit 71, the auditory data filtering unit 72, the tactile data filtering unit 73, the olfactory data filtering unit 74, and the gustatory data filtering unit 75 control, on the basis of the respective output adjustment amounts, timings of outputting respective pieces of the representation information to cause the pieces of the representation information generated from the extended five-sense information detected at a same time to be simultaneously output.

In addition, the second delay adjustment unit 81 may further take into account, as an adjustment amount, each of differences in processing time from when the visual data filtering unit 71, the auditory data filtering unit 72, the tactile data filtering unit 73, the olfactory data filtering unit 74, and the gustatory data filtering unit 75 output the representation information until the visual representation device 41, the auditory representation device 42, the tactile representation device 43, the olfactory representation device 44, and the gustatory representation device 45 of the representation device 4 each provide representation. Moreover, a delay adjustment unit may further be provided between the detection information reception unit 14 and the visual data conversion unit 51, the auditory data conversion unit 52, the tactile data conversion unit 53, the olfactory data conversion unit 54, and the gustatory data conversion unit 55 to adjust input delays. That is, the delay adjustment unit determines delay adjustment amounts (input adjustment amounts) to cause the conversion units and the combining units to perform processing using the five-sense information and the extended five-sense information obtained at a same time, and instructs the conversion units and the combining units to use the respective delay adjustment amounts. This enables the conversion units and the combining units to perform processing using information obtained at a same time. Note that performing delay adjustment on either the input end or the output end can indeed provide the advantage of reducing a incongruous feeling of the user, but performing delay adjustment on both the input end and the output end enables delays to be adjusted more effectively. In addition, delay adjustment may also be performing in the remote manipulation control similarly on any one or both of the input end and the output end.

Note that, for example, the detection information acquisition unit 24 of the apparatus 2 is configured such that the visual information detection unit 241, the extended visual information detection unit 242, the auditory information detection unit 243, the extended auditory information detection unit 244, the tactile information detection unit 245, the extended tactile information detection unit 246, the olfactory information detection unit 247, the extended olfactory information detection unit 248, the gustatory information detection unit 249, and the extended gustatory information detection unit 250 use a same interval of acquisition of information, and the interval of acquisition and the information-transfer-control-interval are the same as each other; but these intervals are not limited as such. When the interval of acquisition is less than the information-transfer-control-interval, the conversion units and the combining units perform conversion and combining using information corresponding to one or multiple intervals of acquisition, received in a single information-transfer-control-interval. For example, the conversion units and the combining units may perform conversion and combining using an average value of information corresponding to multiple intervals of acquisition, or may perform conversion and combining using the median or the like of information corresponding to the intervals of acquisition. In this case, the second delay adjustment unit 81 may adjust the delays using, for example, the average value of time information included in the information corresponding to multiple intervals of acquisition. Alternatively, when the interval of acquisition is longer than the information-transfer-control-interval, the conversion units and the combining units may perform conversion and combining using most recent information or using a value obtained by extrapolation performed using the most recent information and information corresponding to a time therebefore.

In addition, when a significant delay occurs in a part of the information received by the information processing device 1, performing delay adjustment by the first delay adjustment unit 17 and/or the second delay adjustment unit 81 may cause a significant delay over the entire manipulation system 5. In particular, considering that wireless communication tends to be subjected to a larger fluctuation in delay than wired communication, use of wireless communication may cause a significant delay in transmission of some part of information. Accordingly, information of low importance for providing intuitive manipulation may be excluded from data on which delay adjustment is to be performed (hereinafter referred to as data to be delay-adjusted). In this case, this operation may be performed in such a manner that whether delay adjustment is to be performed is predetermined on a per-type-of-information basis, and the type of information on which no delay adjustment is to be performed is excluded regardless of the delay amount, or the type of information on which no delay adjustment is to be performed that has a delay (i.e., difference between the time indicated in time information and the reception time) of a fixed value is excluded. That is, the first delay adjustment unit 17 may exclude control information corresponding to a drive unit of low importance among the multiple apparatus driving units, from control information to be delay-adjusted, and the second delay adjustment unit 81 may exclude a type of combined data corresponding to a sense of low importance among the multiple senses, from combined data to be delay-adjusted.

For example, a certain small amount of delay of the olfactory information or the like will still allow remote manipulation to be performed without a strange feeling. Thus, the olfactory information may be excluded from data to be delay-adjusted. Moreover, in a disaster rescue operation and/or the like, the gustatory information is of low importance, and the gustatory information may therefore be excluded from data to be delay-adjusted. In addition, it is thought that the olfactory information and the gustatory information in a rescue operation in a disaster site and in sport in a snowy mountain for leisure (travel experience) are also of low importance, and that the auditory information in remote cooking is of low importance. These may therefore be also excluded from data to be delay-adjusted. Since the importance of each type of information depends also on the use of the manipulation system 5, the importance-based classification is not limited to the foregoing examples, and the type of information to be excluded from data to be delay-adjusted can be determined according to importance in each use. In addition, since the type of information given high importance may differ from user to user, the type of information to be excluded from data to be delay-adjusted may be selectable by user setting.

Note that the foregoing examples have been described with respect to examples in which the first delay adjustment unit 17 and the second delay adjustment unit 81 are added to the information processing device 1 of the first embodiment, but the information processing device 1 of the first embodiment may be configured to additionally include one of, and not to include the other of, the first delay adjustment unit 17 and the second delay adjustment unit 81.

In addition, the foregoing examples have been described with respect to examples in which the first delay adjustment unit 17 and the second delay adjustment unit 81 are added to the information processing device 1 of the first embodiment, but the first delay adjustment unit 17 and the second delay adjustment unit 81 may be used in a manipulation system that uses no extended five-sense information. For example, the first delay adjustment unit 17 and the second delay adjustment unit 81 may be applied to an information processing device that includes none of the visual data conversion unit 51, the auditory data conversion unit 52, the tactile data conversion unit 53, the olfactory data conversion unit 54, the gustatory data conversion unit 55, the visual data combining unit 61, the auditory data combining unit 62, the tactile data combining unit 63, the olfactory data combining unit 64, and the gustatory data combining unit 65 illustrated in FIG. 9. In addition, moreover, this information processing device does not need to include any of the visual data filtering unit 71, the auditory data filtering unit 72, the tactile data filtering unit 73, the olfactory data filtering unit 74, or the gustatory data filtering unit 75.

The information processing device 1*a* of the present embodiment is implemented in a computer system similarly to the information processing device 1 of the first embodiment.

As described above, in the present embodiment, adjustment of delays in the remote manipulation control enables actions of the apparatus 2 based on pieces of information detected at a same time to be synchronized. This can prevent unsynchronized actions of the apparatus 2. In addition, adjustment of delays in the information transfer control enables representations in the representation device 4 based on pieces of information detected at a same time to be synchronized. This enables the user to perceive pieces of information detected at a same time without feeling a strange feeling.

The configurations described in the foregoing embodiments are merely examples. These configurations may be combined with another known technology, and configurations of different embodiments may be combined together. Moreover, part of such configurations may be omitted and/or modified without departing from the gist.

REFERENCE SIGNS LIST

1, 1*a* information processing device; 2 apparatus; 3 motion information detection device; 4 representation device; 5 manipulation system; 11 control information transmission unit; 12 apparatus control unit; 13 motion information reception unit; 14 detection information reception unit; 15, 15*a* information conversion unit; 16 representation information transmission unit; 17 first delay adjustment unit; 21 control information reception unit; 22 drive control unit; 23 drive unit; 24 detection information acquisition unit; 25 detection information transmission unit; 31 eye information detection unit; 32 ear information detection unit; 33 hand information detection unit; 34 nose information detection unit; 35 mouth information detection unit; 41 visual representation device; 42 auditory representation device; 43 tactile representation device; 44 olfactory representation device; 45 gustatory representation device; 51 visual data conversion unit; 52 auditory data conversion unit; 53 tactile data conversion unit; 54 olfactory data conversion unit; 55 gustatory data conversion unit; 61 visual data combining unit; 62 auditory data combining unit; 63 tactile data combining unit; 64 olfactory data combining unit; 65 gustatory data combining unit; 71 visual data filtering unit; 72 auditory data filtering unit; 73 tactile data filtering unit; 74 olfactory data filtering unit; 75 gustatory data filtering unit; 81 second delay adjustment unit; 231 vision-related apparatus driving unit; 232 audition-related apparatus driving unit; 233 touch-related apparatus driving unit; 234 olfaction-related apparatus driving unit; 235 gustation-related apparatus driving unit; 241 visual information detection unit; 242 extended visual information detection unit; 243 auditory information detection unit; 244 extended auditory information detection unit; 245 tactile information detection unit; 246 extended tactile information detection unit; 247 olfactory information detection unit; 248 extended olfactory information detection unit; 249 gustatory information detection unit; 250 extended gustatory information detection unit.

The invention claimed is:

1. An information processing device comprising:

detection information reception circuitry to receive five-sense information and extended five-sense information, the five-sense information being information at an apparatus, perceivable by at least one of five senses of human, the extended five-sense information being information at the apparatus, imperceptible by the five senses of human, the apparatus being controlled according to a manipulation performed by a user at a location apart from the apparatus;

conversion circuitry to convert the extended five-sense information into converted five-sense data, the converted five-sense data representing information perceivable by at least one of the five senses of human;

combining circuitry to generate combined data as a combination of the converted five-sense data with the five-sense information corresponding to the converted five-sense data;

representation information transmission circuitry to transmit the combined data to a representation device, the representation device being to transfer the combined data to the user to enable the user to perceive the combined data by at least one of the five senses; and filtering circuitry to perform filtering on the combined data, wherein the representation information transmission circuitry transmits the combined data obtained by the filtering, to the representation device.

2. The information processing device according to claim 1, wherein the extended five-sense information is information relating to a sound that is imperceptible by humans.

3. The information processing device according to claim 1, wherein the extended five-sense information is a video of view outside human sight or a result of detection of light having a wavelength outside wavelengths of visible light.

4. The information processing device according to claim 1, wherein the extended five-sense information is information representing at least one of vibration, pressure, airflow, or an inclination difficult to be detected by humans.

5. The information processing device according to claim 1, wherein the extended five-sense information is information relating to a smell that is imperceptible by humans.

6. The information processing device according to claim 1, wherein the extended five-sense information is information related to a taste that is imperceptible by humans.

7. The information processing device according to claim 1, wherein the filtering includes a process of multiplication by a gain dependent on the value of the combined data.

8. The information processing device according to claim 7, wherein the gain has a value greater than 1 when the value of the combined data is less than or equal to a first value, and has a value less than 1 when the value of the combined data is greater than a second value that is greater than the first value.

9. The information processing device according to claim 1, wherein the combined data includes a plurality of pieces of data corresponding to a plurality of senses of the five senses, and the information processing device comprises information transfer delay adjustment circuitry to adjust delays to cause a plurality pieces of the combined data to be simultaneously transferred to the user by a plurality of the representation devices, the plurality of pieces of combined data being corresponding to the five-sense information and to the extended five-sense information obtained at a same time.

10. The information processing device according to claim 9, wherein the information transfer delay adjustment circuitry excludes a piece of data included in the combined data, the piece of data corresponding to a sense of low importance among the plurality of senses, from data on which delay adjustment is to be performed.

11. The information processing device according to claim 1, comprising:

motion information reception circuitry to obtain pieces of motion information, the pieces of the motion information representing positions and actions of parts of the user and corresponding to a plurality of apparatus driving devices of the apparatus;

apparatus control circuitry to generate, using the motion information, pieces of control information for controlling operations of the plurality of apparatus driving devices of the apparatus;

control information transmission circuitry to transmit the control information to the apparatus; and remote control delay adjustment circuitry to adjust delays to cause the operations to be performed simultaneously in the plurality of apparatus driving devices, the operations being based on pieces of the control information generated using pieces of the motion information obtained at a same time.

12. The information processing device according to claim 11, wherein the remote control delay adjustment circuitry excludes a piece of the control information corresponding to one apparatus driving device of low importance among the plurality of apparatus driving devices, from data on which delay adjustment is to be performed.

13. A manipulation system comprising:

an apparatus;

an information processing device to transmit control information to the apparatus, the control information being for controlling the apparatus according to a manipulation performed by a user at a location apart from the apparatus; and a representation device to transfer, to the user, information perceivable by the user by five senses to the user, wherein the apparatus includes detection information acquisition circuitry to detect five-sense information and extended five-sense information, the five-sense information being information at the apparatus and perceivable by at least one of five senses of human, the extended five-sense information being information at the apparatus, imperceptible by the five senses of human, and the information processing device includes detection information reception circuitry to receive the five-sense information and the extended five-sense information from the apparatus, conversion circuitry to convert the extended five-sense information into converted five-sense data, the converted five-sense data representing information perceivable by at least one of the five senses of human, combining circuitry to generate combined data as a combination of the converted five-sense data with the five-sense information corresponding to the converted five-sense data, representation information transmission circuitry to transmit combined data to the representation device, and filtering circuitry to perform filtering on the combined data, wherein the representation information transmission circuitry transmits the combined data obtained by the filtering, to the representation device.

14. An information processing method for use in an information processing device, the information processing method comprising:

receiving five-sense information and extended five-sense information, the five-sense information being information at an apparatus and perceivable by at least one of five senses of human, the extended five-sense information being information at the apparatus and imperceptible by the five senses of human, the apparatus being controlled according to a manipulation performed by a user at a location apart from the apparatus;

converting the extended five-sense information into converted five-sense data, the converted five-sense data representing information perceivable by at least one of the five senses of human;

generating combined data as a combination of the converted five-sense data with the five-sense information corresponding to the converted five-sense data;

transmitting the combined data to a representation device, the representation device being to transfer the combined data to the user to enable the user to perceive the combined data by at least one of the five senses; and performing filtering on the combined data, wherein the transmitting comprises transmitted the combined data obtained by the filtering.

15. The information processing method according to claim 14, comprising:

generating control information for controlling the apparatus; and transmitting the control information to the apparatus.

16. A non-transitory computer readable storage medium storing a program causing a computer system to perform:

receiving five-sense information and extended five-sense information, the five-sense information being information at an apparatus and perceivable by at least one of five senses of human, the extended five-sense information being information at the apparatus and imperceptible by the five senses of human, the apparatus being controlled according to a manipulation performed by a user at a location apart from the apparatus;

converting the extended five-sense information into converted five-sense data, the converted five-sense data representing information perceivable by at least one of the five senses of human;

generating combined data as a combination of the converted five-sense data with the five-sense information corresponding to the converted five-sense data;

transmitting the combined data to a representation device, the representation device being to transfer the combined data to the user to enable the user to perceive the combined data by at least one of the five senses; and performing filtering on the combined data, wherein the transmitting comprises transmitting the combined data obtained by the filtering.

* * * * *